(12) United States Patent
Kulkarni et al.

(10) Patent No.: US 11,349,922 B2
(45) Date of Patent: May 31, 2022

(54) SYSTEM AND METHOD FOR A DATABASE PROXY

(71) Applicant: MARVELL ASIA PTE, LTD., Singapore (SG)

(72) Inventors: Chidamber Kulkarni, Richmond (CA); Amarnath Vishwakarma, Hyderabad (IN); Raushan Raj, Hyderabad (IN); Vijaya Raghava Chiyedu, Hyderabad (IN); Rahul Sachdev, Hyderabad (IN); Rahul Jain, Hyderabad (IN); Prasanna Sukumar, Pleasanton, CA (US); Prasanna Sundararajan, Mountain View, CA (US)

(73) Assignee: MARVELL ASIA PTE LTD., Singapore (SG)

(*) Notice: Subject to any disclaimer, the term of this patent is extended or adjusted under 35 U.S.C. 154(b) by 94 days.

(21) Appl. No.: 16/661,259

(22) Filed: Oct. 23, 2019

(65) Prior Publication Data
US 2020/0059515 A1  Feb. 20, 2020

Related U.S. Application Data

(63) Continuation-in-part of application No. 16/351,818, filed on Mar. 13, 2019, now Pat. No. 11,044,314, (Continued)

(51) Int. Cl.
*H04L 67/1097* (2022.01)
*H04L 67/60* (2022.01)
(Continued)

(52) U.S. Cl.
CPC ........ *H04L 67/1097* (2013.01); *G06F 16/252* (2019.01); *H04L 67/28* (2013.01);
(Continued)

(58) Field of Classification Search
CPC ......... H04L 41/22; H04L 63/10; H04L 67/42; H04L 67/02; H04L 63/08; H04L 67/141;
(Continued)

(56) References Cited

U.S. PATENT DOCUMENTS 5,515,531 A    5/1996  Fujiwara et al.
5,999,941 A   12/1999  Andersen
(Continued)

FOREIGN PATENT DOCUMENTS

CN    101848245 A    9/2010
CN    102103544 A    6/2011
(Continued)

OTHER PUBLICATIONS

Non-Final Office Action received for U.S. Appl. No. 16/351,818, dated May 15, 2020, 14 pages.
(Continued)

*Primary Examiner* — Michael A Keller
*Assistant Examiner* — Thao D Duong

(57) ABSTRACT

A database proxy includes a computing device and a hardware-accelerated database proxy module. The computing device includes one or more processors, memory, a first bus interface, and a network interface coupling the database proxy to one or more networks. The database proxy module includes a second bus interface coupled to the first bus interface via one or more buses, and a request processor. The database proxy is configured to receive a database read request from a client via the one or more networks and the network interface; forward the database read request to the request processor using the one or more buses; process, using the request processor, the database read request; and return results of the database read request to the client. In some embodiments, the computing device or the database
(Continued)

proxy module further includes a flash memory interface for accessing one or more flash memory devices.

13 Claims, 15 Drawing Sheets

Related U.S. Application Data which is a continuation of application No. 15/344,993, filed on Nov. 7, 2016, now Pat. No. 10,237,350.

(60) Provisional application No. 62/383,297, filed on Sep. 2, 2016, provisional application No. 62/319,223, filed on Apr. 6, 2016.

(51) Int. Cl.

| | | |
|---|---|---|
| *G06F 16/25* | (2019.01) | |
| *H04L 67/56* | (2022.01) | |
| *H04L 67/568* | (2022.01) | |
| *G06F 16/2458* | (2019.01) | |

(52) U.S. Cl.
CPC .......... *H04L 67/32* (2013.01); *G06F 16/2471* (2019.01); *H04L 67/2842* (2013.01)

(58) Field of Classification Search
CPC ........ H04L 41/12; H04L 67/10; H04W 12/06; H04W 12/065; H04W 4/80; H04W 12/00; H04W 12/033; H04W 12/0431; H04W 12/08

See application file for complete search history.

(56) References Cited

U.S. PATENT DOCUMENTS

| | | | |
|---|---|---|---|
| 6,341,311 B1* | 1/2002 | Smith ................ H04L 29/06 | 709/226 |
| 6,801,927 B1 | 10/2004 | Smith et al. | |
| 7,552,223 B1 | 6/2009 | Ackaouy et al. | |
| 7,870,120 B2* | 1/2011 | Andreev .......... G06F 16/24553 | 707/713 |
| 8,595,308 B1* | 11/2013 | Kloba ................. H04L 67/04 | 709/207 |
| 8,949,294 B2* | 2/2015 | Surtani ................ G06F 16/289 | 707/812 |
| 9,286,221 B1 | 3/2016 | Sundararajan et al. | |
| 10,061,852 B1* | 8/2018 | Plenderleith ........ H04L 67/2842 | |
| 2002/0023114 A1 | 2/2002 | Ito | |
| 2004/0054777 A1 | 3/2004 | Ackaouy et al. | |
| 2005/0102427 A1 | 5/2005 | Yokota et al. | |
| 2008/0228521 A1 | 9/2008 | Wilmering et al. | |
| 2009/0094371 A1* | 4/2009 | Ly ..................... H04L 67/2814 | 709/228 |
| 2010/0174939 A1* | 7/2010 | Vexler .............. G06F 16/24552 | 707/747 |
| 2010/0180284 A1 | 7/2010 | Ross | |
| 2011/0131341 A1 | 6/2011 | Yoo et al. | |
| 2011/0320019 A1 | 12/2011 | Lanciani et al. | |
| 2012/0016931 A1 | 1/2012 | Singh et al. | |
| 2012/0102134 A1 | 4/2012 | Burckart et al. | |
| 2013/0019000 A1* | 1/2013 | Markus ................ G06F 9/466 | 709/223 |
| 2013/0219472 A1* | 8/2013 | Hsu ..................... H04L 63/0815 | 726/4 |
| 2015/0264151 A1* | 9/2015 | Singh ................ H04L 67/2842 | 709/203 |
| 2015/0341466 A1* | 11/2015 | Sah ........................ H04L 45/00 | 707/770 |
| 2016/0119903 A1 | 4/2016 | Skog et al. | |
| 2017/0195449 A1* | 7/2017 | Mobbs ................ G06F 16/2455 | |
| 2017/0295236 A1 | 10/2017 | Kulkarni et al. | |
| 2017/0374151 A1* | 12/2017 | Moorthi .............. H04L 67/2847 | |
| 2018/0075086 A1 | 3/2018 | Yam et al. | |
| 2019/0273782 A1 | 9/2019 | Kulkarni et al. | |
| 2020/0053181 A1* | 2/2020 | Long, III .............. H04L 47/821 | |

FOREIGN PATENT DOCUMENTS

| | | |
|---|---|---|
| CN | 102262680 A | 11/2011 |
| CN | 102594798 A | 7/2012 |
| CN | 103209121 A | 7/2013 |
| CN | 104219085 A | 12/2014 |
| CN | 104750558 A | 7/2015 |
| CN | 105122241 A | 12/2015 |
| WO | 2017/176533 A1 | 10/2017 |

OTHER PUBLICATIONS

Final Office Action received for U.S. Appl. No. 16/351,818, dated Nov. 27, 2020, 15 pages.
Notice of Allowance received for U.S. Appl. No. 16/351,818, dated Feb. 10, 2021, 8 pages.
Final Office Action received for U.S. Appl. No. 16/351,818, dated Feb. 6, 2020, 13 pages.
GemStone Systems Inc. et al., Gem Fire Enterprise—Architectural Overview, Internet Citation (Jan. 1, 2006) pp. 1-72 XP-002695753.
Hazelcast, Inc., Hazelcast Documentation, version 3.6—RC1, Jan. 10, 2016, pp. 1-392, XP-055370017.
Joseph Ruzzi, Oracle Coherence—Getting Started Guide, Release 3.5, Jun. 1, 2009, pp. 1-176, XP-055370008.
Coodoing, "Database Design of High Concurrency System", Retrieved from https://www.cnblogs.com/ttltry-air/archive/2012/08/13/2636884.html, Aug. 13, 2012, 12 pages.
Zhiwei, Xiao, "China Excellent Master's Thesis Full-text Database Information Technology Series", Design of Hierarchical MapReduce Model for Multi-core Cluster and Realization, Mar. 15, 2013, 59 pages.
Molitor, Kerri, "Caching Options for Optimizing Your VPS", Retrieved from https://www.liquidweb.com/blog/caching-options-for-optimizing-your-vps/, on Aug. 4, 2021, Aug. 14, 2015, 5 pages.

* cited by examiner

SYSTEM AND METHOD FOR A DATABASE PROXY

RELATED APPLICATIONS

The present application is a continuation-in-part of U.S. patent application Ser. No. 16/351,818, filed Mar. 13, 2019, which is a continuation of U.S. patent application Ser. No. 15/344,993, filed Nov. 7, 2016 and now U.S. Pat. No. 10,237,350, and claims priority benefit of U.S. Provisional Patent Application No. 62/383,297, filed Sep. 2, 2016 and U.S. Provisional Patent Application No. 62/319,223, filed Apr. 6, 2016. The subject matter of these related applications is hereby incorporated herein by reference.

TECHNICAL FIELD

The present disclosure relates generally to computing systems and the use of proxy technology between an application server and a database server/store.

BACKGROUND

Data center architecture has been evolving rapidly over the last decade. This includes changes to the data center architecture for systems including one or more NoSQL data servers (also referred to as NoSQL data stores). Each customer can have different data center architectures for specific application(s).

Typically there are four tiers in a data center architecture that also uses a NoSQL data store. The four tiers are: web tier comprising front end web servers, application tier comprising application servers, data tier comprising database servers, and storage tier. FIG. 1 shows a typical architecture of data center for an Internet company (e.g., Yahoo, LinkedIn, eBay, etc.) comprising the four tiers. The dotted lines separate different tiers of servers based on their functional attributes related to specific data center architecture.

In the data center architecture of FIG. 1, the application servers are responsible for running the business or application logic. The storage tier is accessed via database servers, such as the NoSQL servers of FIG. 1. These NoSQL servers act as access medium to the NoSQL data stores. Application logic accesses the NoSQL data store to manage data. Below are the typical steps involved in retrieving required (READ operation) data from a data store:
1. Application logic wants a specific data that is associated with a key. The application, for example, speaks JavaScript Object Notation (JSON).
2. Application will open a connection to the NoSQL data server and request the data associated with that key.
3. If the NoSQL data server speaks another format, e.g., Binary JSON (BSON), then application server needs to convert its request to BSON first (or NoSQL server needs to parse JSON).
4. The NoSQL server will now check if the data associated with the key is available in its local cache, if not it will fetch it from the persistent storage.
5. In case NoSQL server has to fetch from the persistent storage, it needs to resolve if the key points to a secondary index or primary index. If it is a secondary index, then it needs to be converted to primary index.
6. Finally, the data is now retrieved either from local cache or persistent storage and returned to the application logic.

This approach suffers from several possible bottlenecks that limit efficient scaling of application deployment using NoSQL data stores. Accordingly, improved approaches to the NoSQL data center architecture are desirable.

SUMMARY

According to some embodiments a NoSQL proxy includes a packet processor for exchanging messages over a network with one or more application servers, NoSQL data stores, and peer NoSQL proxies, a proxy finite state machine for managing data access commands received by the NoSQL proxy, an interface for accessing cached data in a hybrid memory management unit, and a data access command processing unit for translating secondary indexes to primary indexes, translating data between data formats, and evaluating and filtering data access command results. The NoSQL proxy is configured to receive a data access command, process the data access command using cached data when data associated with the data access command is cached locally, forward the data access command to the one of the peer NoSQL proxies when the data is cached in the one of the peer NoSQL proxies, forward the data access command to one of the NoSQL data stores when the data is not cached or changes to the data are written through to the one of the NoSQL data stores, and return results of the data access command.

According to some embodiments, a database proxy includes a request processor, a cache coupled to the request processor, a database plugin coupled to the request processor, a first interface for coupling the request processor to one or more client devices, a second interface for coupling the request processor to one or more other database proxies, and a third interface for coupling the database plugin to one or more database servers. The request processor is configured to receive a database read request from a client using the first interface, determine whether the database read request is assigned to the database proxy, and return results of the database read request to the client using the first interface. When the database read request is not assigned to the database proxy, the request processor is configured forward the database read request to a first one of the one or more other database proxies using the second interface. When the database read request is assigned to the database proxy, the request processor is configured to process the database read request using data stored in the cache when data associated with the database read request is stored in the cache and forward the database read request to the database plugin when the data associated with the database read request is not stored in the cache and store results of the database read request received from the database plugin in the cache. The database plugin is configured to forward the database read request to a first one of the one or more database servers, receive the results of the database read request from the first one of the one or more database servers, and return the results to the request processor.

According to some embodiments, a method of processing database read requests using database proxies includes a request processor of a first database proxy receiving a database read request from a client using a first interface, determining whether the database read request is assigned to the first database proxy, and returning results of the database read request to the client using the first interface. When the database read request is not assigned to the first database proxy, the method further includes the request processor forwarding the database read request to a second database proxy using a second interface. When the database read request is assigned to the first database proxy, the method further includes processing, by the request processor, the database read request using data stored in a cache when data associated with the database read request is stored in the cache and forwarding, by a database plugin of the first database proxy, the database read request to a database server and storing, by the request processor, results of the database read request received from the database plugin in the cache when the data associated with the database read request is not stored in the cache.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
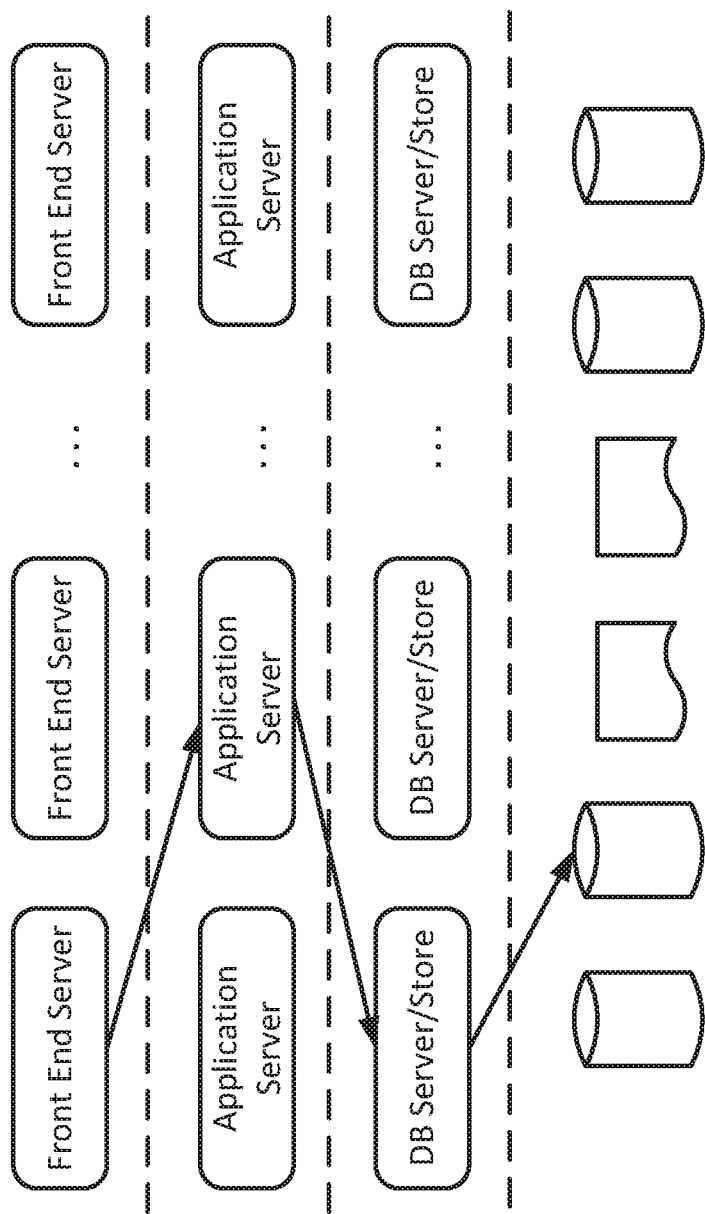
FIG. 1 is a simplified diagram of a typical data center architecture according to some embodiments.
Figure 2:
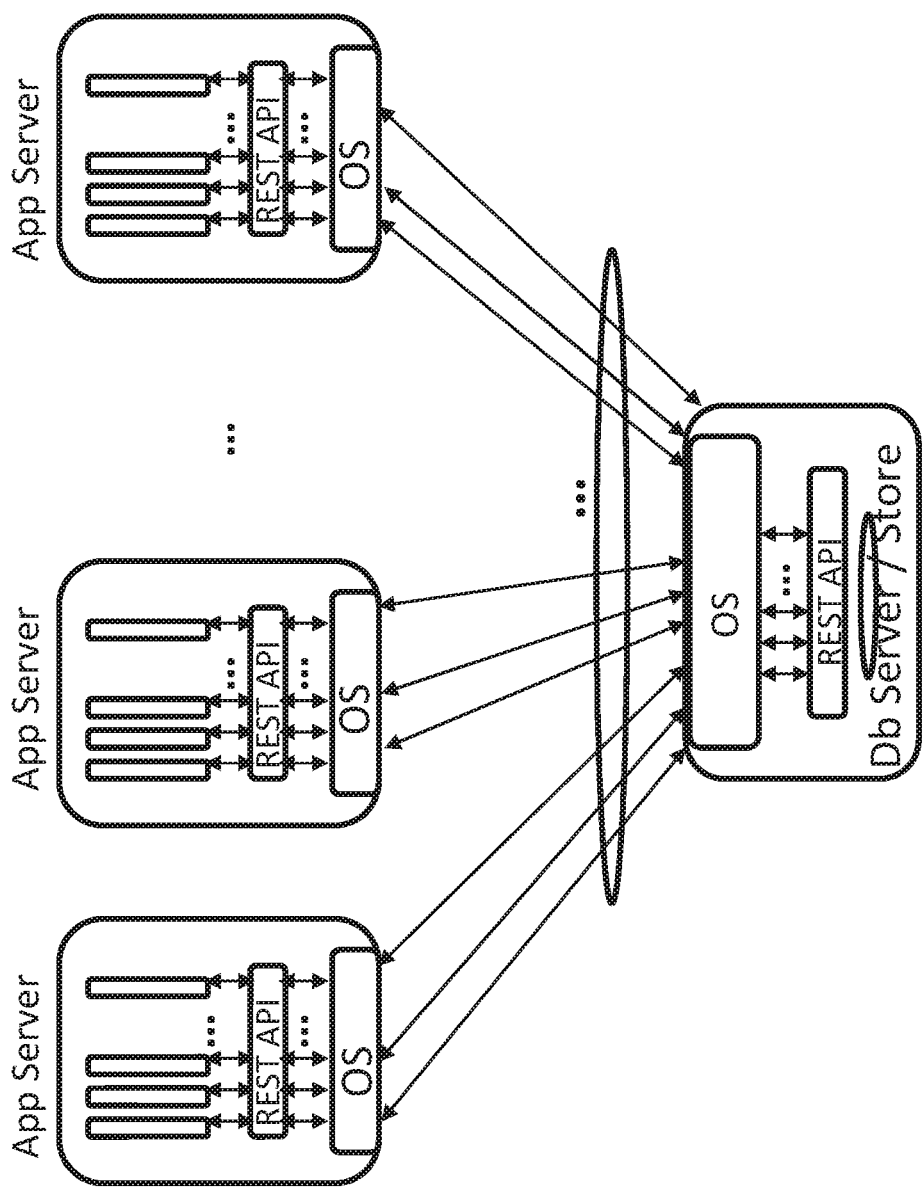
FIG. 2 is a simplified diagram of a NoSQL data server/store use case according to some embodiments.

FIG. 2 shows a sub-set view of the data center architecture in FIG. 1. FIG. 2 helps illustrate points in the architecture where challenges exist.

In FIG. 2, notice the use of representational state transfer (REST) application programming interface (API) on the application servers in conjunction with a container based deployment. Many NoSQL data stores support four main operations, CREATE, READ, UPDATE, and DELETE, represented using the acronym CRUD. As described below, the various embodiments are orthogonal to container technology and will work with both containers and virtual machine (VM)-based deployment models as well as with bare metal servers without the use of containers or VMs. Performance is typically measured using two main metrics for NoSQL data stores: first, throughput is measured using transactions per second (TPS), and second, latency of data access between application server and NoSQL data store. In some examples, performance measured by these or other metrics is typically provided according to a system-level agreement (SLA).

FIG. 2 further illustrates a REST API, however this does not preclude a native API based solution in the context of the described embodiments.

There are several possible bottlenecks and limitations that limit efficient scaling of application deployment using NoSQL data stores having the architecture shown in FIG. 2.

1. Connection scatter-gather: As seen in FIG. 2, there is an explosion of network connections between the application server and the NoSQL data server. Thus both the application server and the NoSQL data server are asked to support a lot of network connections, more so for NoSQL data server. This usually impacts the latency of accesses between application server and NoSQL data store (SLA).
2. Need for increased operating data set: Operating data set is an important criterion for exploiting data locality. An operating data set for a NoSQL data store is the data set and its neighboring data sets (or related data sets) that are currently being processed. In embodiments of the architecture, the operating data set is limited by the available memory on the NoSQL data server. Adding SSD Flash memory is an option but it will take away useful cycles from the NoSQL data server towards managing the Flash memory.
3. Data serialization and deserialization (serdes): Given the applications use a different serialization protocol and the NoSQL data stores use a different one, additional processing is performed either in the NoSQL data server or on the application server. This results in lower throughput (TPS).
4. Converting secondary index to primary index: For data that is retrieved from the persistent storage, the NoSQL data server often has to convert the secondary index to primary index. For example, in some of the larger installations, customers end up using a secondary non-blocking specialized indexing engine to lookup the primary indexes associated with a secondary index (e.g., Espresso at LinkedIn uses Lucene for secondary index lookup). Typically there is a degradation of 5-10% in performance on the write throughput. However, as described below, the secondary indexing engine is optional and may be omitted in the described embodiments.
5. Management of compression, decompression, encryption, security, and/or other related protocols may often have a negative impact on throughput, etc. as processor and other computing resources are often dedicated to these tasks.

6. Business continuity: When an unforeseen event brings the NoSQL data server down, a service that can serve the applications with required data from a duplicate store is also advantageous.

Scaling NoSQL data stores to serve millions (and millions) of transactions often involves adding many CPU servers both to the application tier as well as to the NoSQL data tier. This makes the scaling of NoSQL data stores highly inefficient.

Several approaches may be used to create scalable NoSQL data stores. These approaches include: adding a caching tier (e.g. memcached, etc.) using commodity servers with larger memory, using a pool of connections in the application server to talk to NoSQL data store, thus using a fixed number of connections and writing a scheduler to manage data over these connections, and a NoSQL proxy, without a cache, implemented in the application server to reduce the number of connections to the caching tier. These methods rely on a separate caching (or memory) tier. To support large addressable memory space in an efficient manner, one needs a tiered memory architecture that can support SRAM, DRAM, and Flash memories.

The NoSQL proxy in the embodiments described below supports a tiered memory architecture. The above methods support a native wire protocol such as memcached, etc. to keep the protocol overhead minimal at the cost of less flexibility in the application logic. Supporting REST interface allows application logic to be flexible to migrate to another NoSQL data store if necessary. In some example, the NoSQL proxy proposed here supports a REST interface, since the efficient REST implementation results in a negligible overhead. Finally, a high throughput and low latency packet processor enables supporting different network bandwidths at the network interface (e.g. Ethernet interface). For example, NoSQL proxy can support, 1 Gb/s to 40 Gb/s in the same architecture.

To address the above challenges, a NoSQL Proxy that provides an efficient solution to scale additional traffic between application servers and NoSQL data servers is desirable. As described below, several embodiments of a NoSQL Proxy address these challenges.

Figure 3:
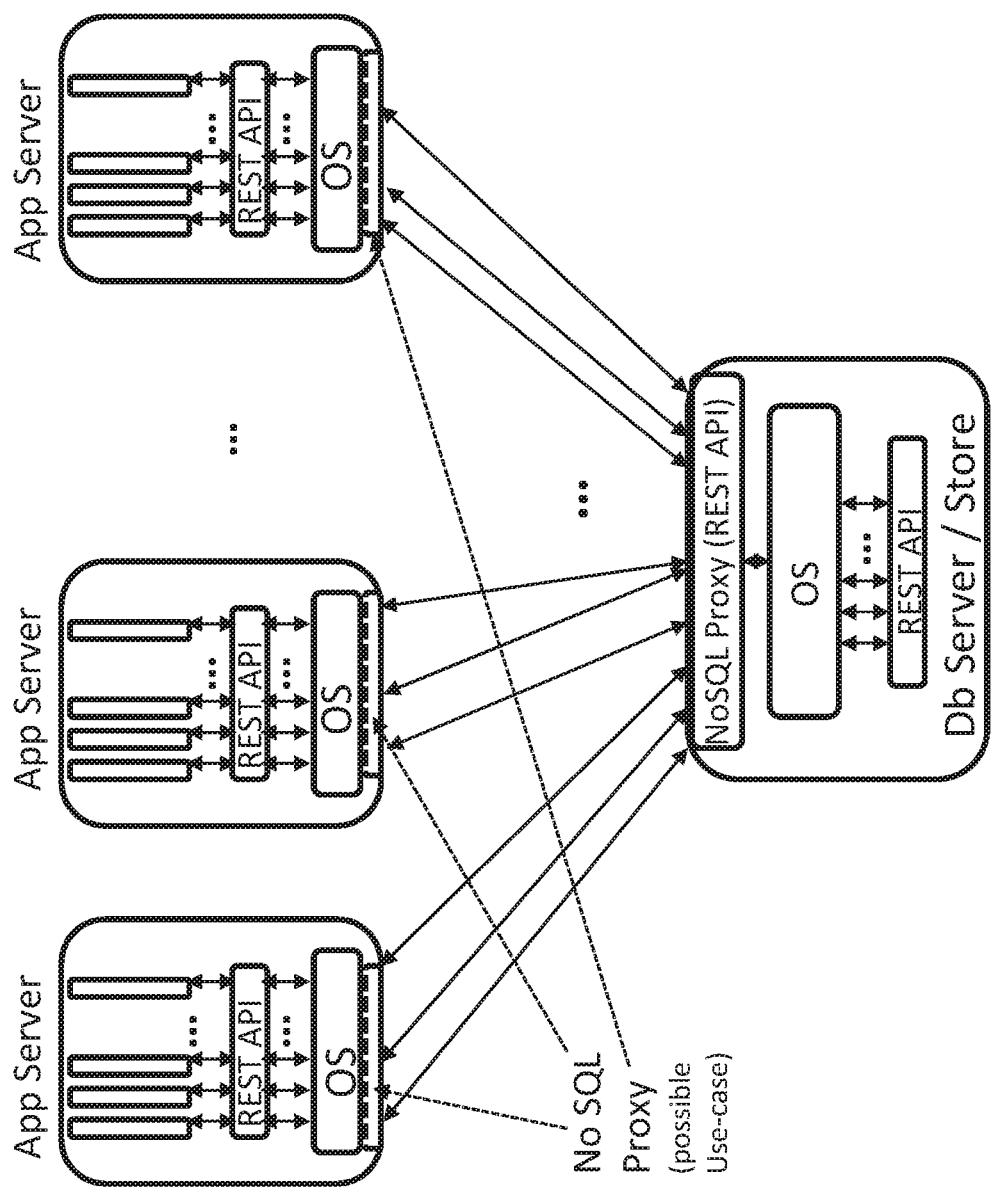
FIG. 3 is a simplified diagram of a NoSQL Proxy within an existing data center architecture according to some embodiments.

A NoSQL Proxy is a proxy that sits between an application server and a NoSQL data server. Its primary function is to act as a proxy for the underlying NoSQL data store, while supporting a REST API. The application logic interacts with the NoSQL Proxy's REST API without the knowledge of the specific NoSQL data store underneath. FIG. 3 illustrates the use of NoSQL Proxy based on the architecture used in FIG. 2. Notice that the NoSQL Proxy can reside in either the NoSQL data server or the application server. The implications of where the NoSQL proxy resides on the scaling as well as its ability to address the challenges identified earlier are described in further detail below.

The NoSQL Proxy is a proxy that allows for efficient scaling of traffic between application servers and NoSQL data servers. The features of the NoSQL Proxy that allow the NoSQL proxy to scale to millions of low latency transactions are listed below. As Moore's law scales the gains will scale accordingly.

Figure 4:
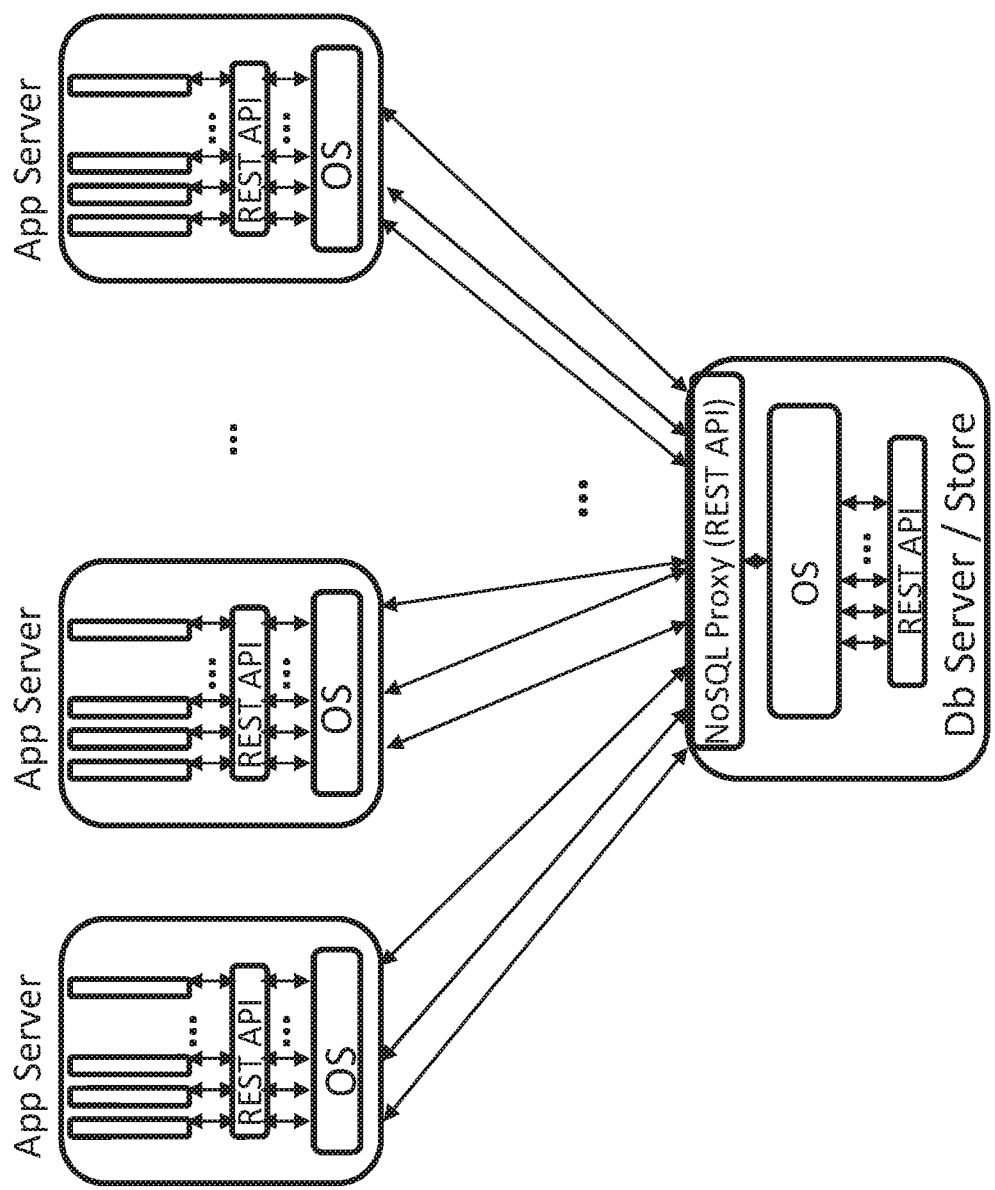
FIG. 4 is a simplified diagram of a data center architecture with a NoSQL proxy in the database server according to some embodiments.

High throughput—millions of transactions/sec (e.g. up to 10 M TPS)
Network IO—high fan out, low-latency packet processor
  Up to 10,000 TCP connections with <1ms latency per connection Flexibility to configure the size of key-value (KV) store or the cache
  Terabytes of data store (e.g., up to 4 TB) using tiered memory
Line-rate data serialization and deserialization
  Support for multiple data serialization/deserialization (serdes) formats (JSON, BSON, Protobuf, . . . )
Line-rate secondary index to primary index conversion
Full control over how data is managed with a powerful default
  Persistence of data supported via configuration API (both dynamic and static)
  Ability to expire/expel any amount of data in store (data flush)
  No replication of cache data in case of deployment in application servers
    Networked interface to query other Proxies on application servers
High availability—operational even when NoSQL data server goes down
REST API for application logic An exemplary use case when the NoSQL Proxy resides in the NoSQL data server is shown in FIG. 4. In this use case, a typical call sequence is as follows:

1. Application logic maintains a pool of connections open to the NoSQL Proxy. When the application logic needs to retrieve specific data, it requests the data using the associated key and using a REST API (as described later in the document) supported by the NoSQL Proxy.

2. The NoSQL Proxy reads the REST API and checks if the requested key is available in the local cache of the NoSQL Proxy, and if it is, then it returns the data in the appropriate data format. If the key is not available in the cache, the NoSQL Proxy checks if the key points to a secondary index, if so then it converts the secondary index to primary index and then retrieves corresponding data from the persistent NoSQL store. The NoSQL Proxy then returns the data back to the application logic while adding it to the local cache and updating the Least Recently Used (LRU) tag.

It is helpful to note that the NoSQL Proxy is performing various computational steps such as network connection management, data serdes, and conversion of secondary to primary index. Thus, relieving the NoSQL data server of these tasks.

Figure 5:
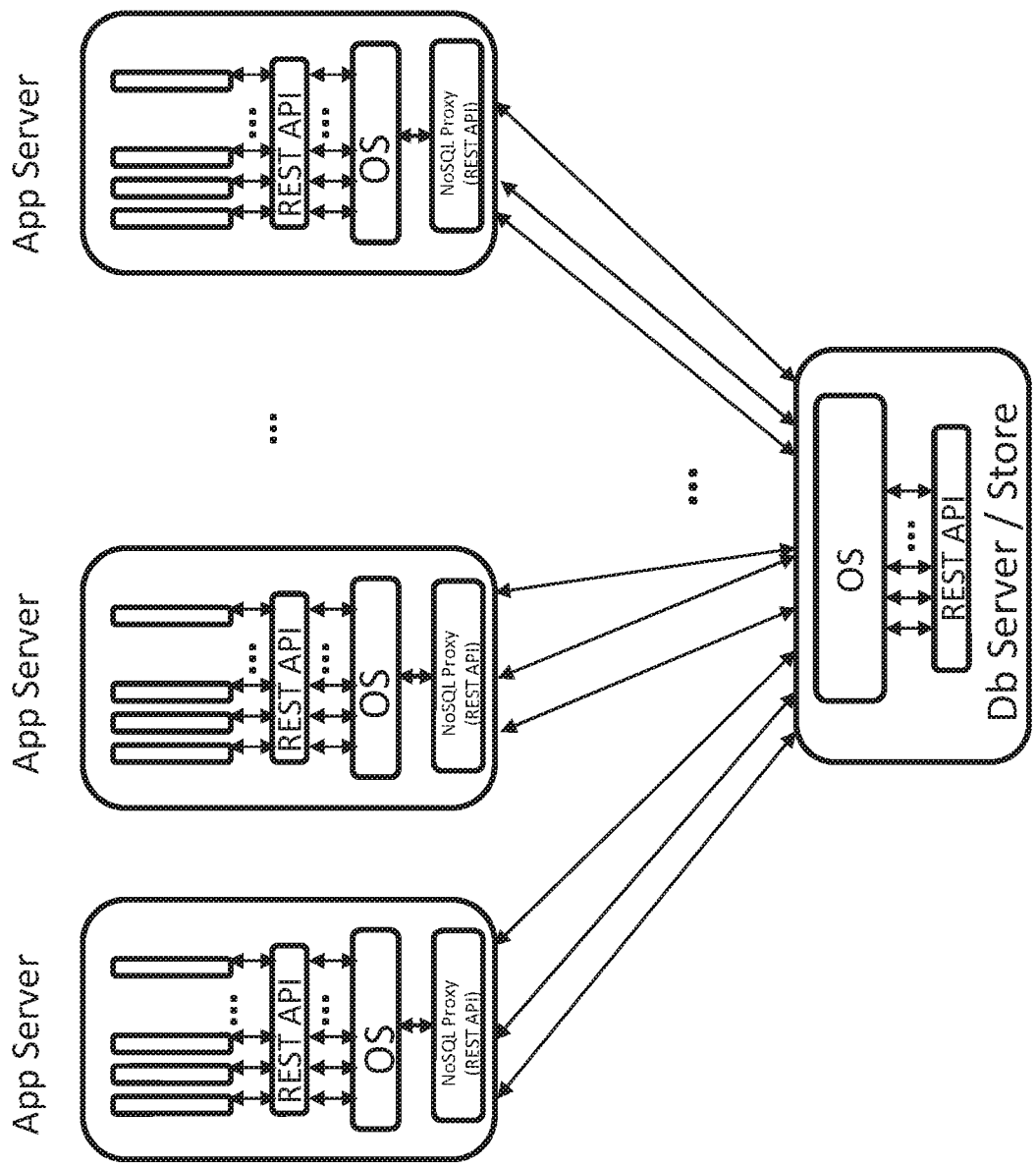
FIG. 5 is a simplified diagram of a data center architecture with a NoSQL proxy in the application server according to some embodiments.

An exemplary use case when the NoSQL Proxy resides in the application server and uses a REST API is shown in FIG. 5. In this use case, a typical call sequence is as follows:

1. Application logic maintains a pool of connections open to the NoSQL proxy. The application logic talks to the Proxy via a REST API (can be implemented over PCIe link as needed). When the application logic uses a specific data format, it requests the NoSQL Proxy for the same.

2. The NoSQL Proxy in turn looks up if the data is available in the cache or in any other peer Proxy or it locates the target NoSQL data server from which to request the data. Once the location of data is identified, the NoSQL Proxy will retrieve data and return it back to the application logic. Similar to the earlier use case, the Proxy will perform secondary to primary index conversion as well as data serdes.

In this use scenario, the NoSQL Proxy has lower latency since the NoSQL Proxy is close to the application logic avoiding additional hops to a top of the rack (TOR) switch, etc.

Figure 6:
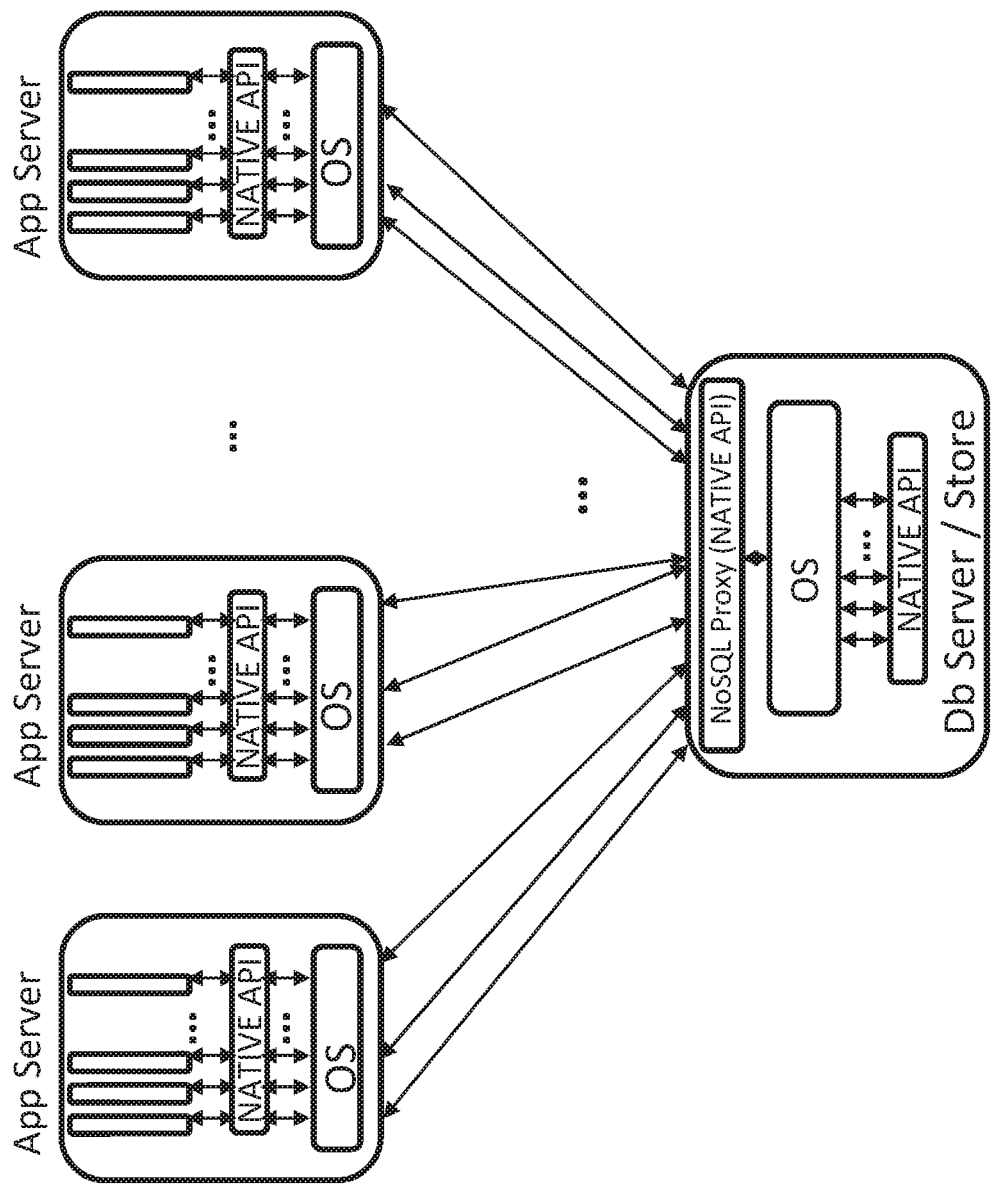
FIG. 6 is a simplified diagram of a data center architecture with a NoSQL proxy in the database server that supports a native application programming interface according to some embodiments.

An exemplary use case when the NoSQL Proxy resides in the NoSQL data server and uses a native API is shown in FIG. 6. The typical call sequence for the NoSQL Proxy of FIG. 6 is similar to the call sequence for the NoSQL Proxy of FIG. 4 with the exception of the use of a native API rather than a REST API.

Figure 7:
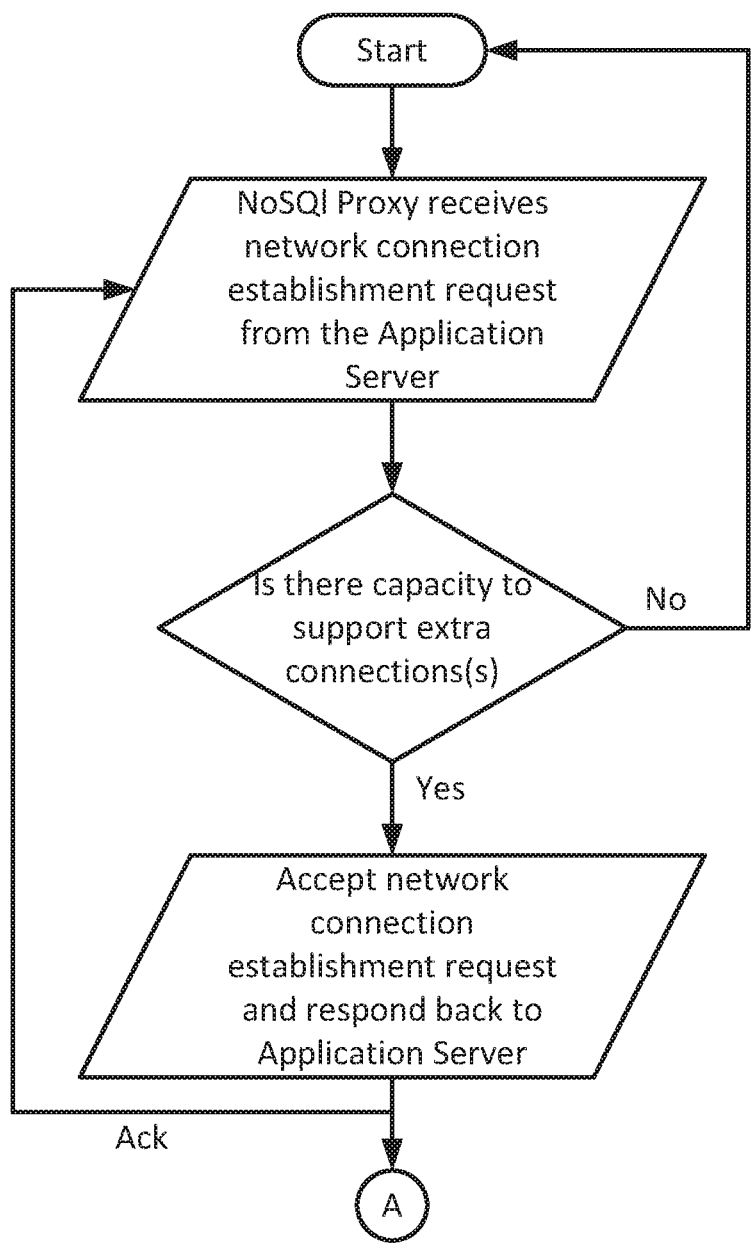
FIG. 7 is a simplified diagram of a method of connection establishment between a NoSQL proxy and an application server as well as a NoSQL data server according to some embodiments.

FIG. 7 is a simplified diagram of a method of connection establishment between a NoSQL proxy and an application server as well a NoSQL data server according to some embodiments. As shown in FIG. 7, the NoSQL Proxy is able to support connection management between the application server and the NoSQL server by monitoring the number of connections between the application server and the NoSQL server.

Figure 8:
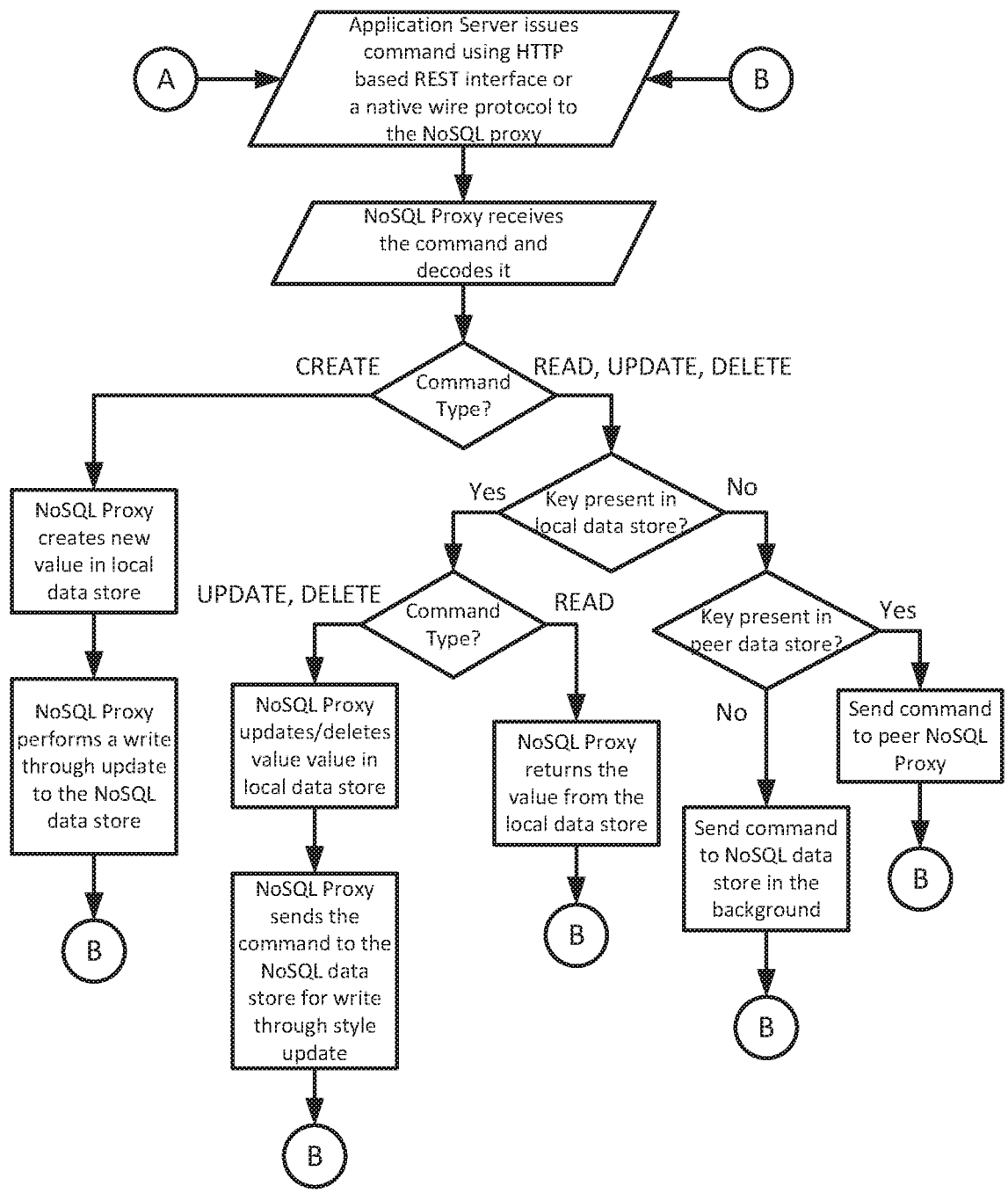
FIG. 8 is a simplified diagram of a method of performing CRUD operations using a NoSQL Proxy according to some embodiments.

FIG. 8 is a simplified diagram of a method of performing CRUD operations using a NoSQL Proxy according to some embodiments. As shown in FIG. 8, commands are handled based on the type of command (CREATE, READ, UPDATE, and/or DELETE) and where the data associated with the command is located. When the command is a CREATE command, the NoSQL Proxy creates and stores the new data in its local data store and then passes the CREATE command to the NoSQL data store using a write through strategy. When the command is a READ, UPDATE, or DELETE command, the NoSQL Proxy first checks whether the associated data is cached locally. When the data is cached locally, the READ command is handled directly by returning the copy of the data from the local data store. When the data is cached locally, the UPDATE and DELETE commands are handled directly by making changes in the local data store and then the command is forwarded to the NoSQL data store to make the respective update or delete in the NoSQL data store copy of the data. When the data is not cached locally, the NoSQL Proxy checks to see if a peer NoSQL Proxy has cached the data. When the data is cached by a peer NoSQL Proxy, the command is forwarded to the peer NoSQL Proxy for handling. When the data is not cached locally or in a peer NoSQL Proxy, the command is passed to the NoSQL data store for handling. In some examples, when READ and/or UPDATE are forwarded to the NoSQL data store when the data is not cached locally, the data read and/or update may be cached locally to support future commands using that data.

Figure 9:
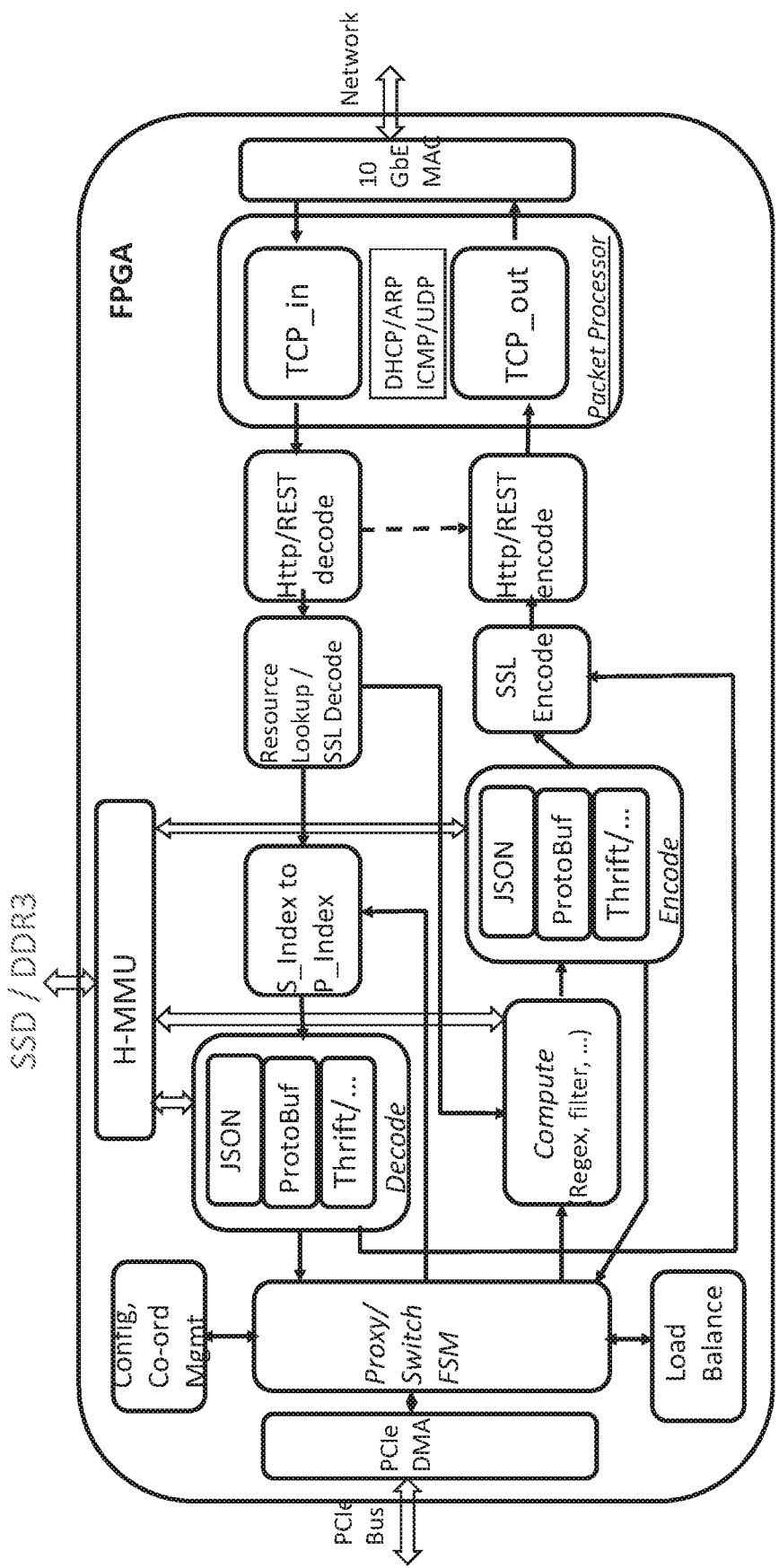
FIG. 9 is a simplified diagram of an internal architecture for a NoSQL proxy according to some embodiments.

FIG. 9 is a simplified diagram of an internal architecture for a NoSQL Proxy according to some embodiments. The NoSQL Proxy may be implemented using any suitable combination of one or more central processing units, processors, multi-core processors, microprocessors, field programmable gate arrays (FPGAs), application specific integrated circuits (ASICs), systems on a chip (SOCs), off the shelf components, boards, and/or the like; including, for example, a combination of one or more central processing units and FPGAs, a combination of one or more FPGAs and SOCs, and/or the like. As shown in FIG. 9, the NoSQL Proxy includes the following subsystems:

1. the IO sub-system includes a 10 GbE MAC, a hybrid memory controller interfacing with DDR3 DRAM memory and SSD Flash memory, and a PCIe 3.0 interface. In some examples, this sub-system is implemented in Verilog. Depending upon whether the NoSQL Proxy is located in the application server or the NoSQL data store, data commands to be processed by the NoSQL Proxy may be received via the PCIe interface and/or the network via the 10 GbE MAC.

2. the packet processor manages Ethernet and TCP/IP connections with, for example, a Linux server. In some examples, the packet processor may be implemented in C and is operable with a standard Linux distribution, such as CentOS as well as on FPGA. The packet processor supports IPv4, TCP, DHCP, ARP, ICMP protocols. A suitable packet processor is described further in U.S. Patent Application Ser. No. 62/681,922, titled "Bid Gateway for a Real-time Ad Bidding" and filed in January 2016, which is hereby incorporated by reference in its entirety.

3. a secure REST interface includes a HTTP engine and an SSL engine. In some examples, in this sub-system, a REST interface encoder and decoder are implemented based on a HTTP engine. In some examples, the REST interface supports SSL encoding and decoding for secure data exchange.

4. a data serdes engine supports various serdes protocols (e.g., JSON, ProtoBuf, Thrift, etc.). The data serdes engine allows for instantiating various serdes protocols with an ability to do protocol translation at line-rate. For example, the incoming data requests can be in JSON, whereas the NoSQL data server returns data in BSON or Thrift. The data serdes engine will perform data format translation and return back valid JSON data to the application logic.

5. an index converter provides support for line rate translation of secondary indices included as part of data request to primary indices. This allows the data request to be completed using the more efficient primary indices.

6. a Proxy finite state machine (FSM) that comprises a FSM to manage various data and control transactions. The Proxy FSM keeps track of the state information of the NoSQL Proxy on a per-transaction basis and/or on a per-connection basis. It also interfaces with the configuration and coordination engine as well as the load balancer to determine appropriate actions (e.g., forwarding requests to another peer NoSQL Proxy).

7. a configuration and coordination engine that manages consensus and coordination among the sub-systems and/or other peer NoSQL Proxies operating in cooperation with the current NoSQL Proxy. Usually there is a trade-off between accepting data loss or delay or inconsistency and devoting more CPU cycles and network bandwidth to this function. One of the blocks in the configuration and coordination engine that can be accelerated and made highly efficient is the atomic broadcast (at the leader side) and the register and response block (at the follower side). In some examples, these improvements are implemented in the configuration and coordination engine so that scaling to more NoSQL Proxies becomes efficient. In some examples, the configuration and coordination engine operates using the Apache ZooKeeper project. In some examples, Zookeeper is used for consensus and coordination of status and functional upkeep information (e.g., service is at w.x.y.z IP address, supports xxx Mb/s traffic, service is up, etc.). In some examples, Zookeeper is not for general data sharing between NoSQL Proxies, which occurs over the network interface.

8. a load balancer to interface with other peer NoSQL Proxy instances to better manage the application side traffic. In some examples, the load balancer maintains a set of counters and logic to measure a targeted metric (e.g., transactions per second, Mb/s or Gb/s, and/or the like) and decides whether a particular peer NoSQL Proxy is running at a load higher than a present number (e.g., 85%, 90%, and/or the like). In some examples, when it appears based on the targeted metric that a NoSQL Proxy is likely not going to be able to meet the set SLA, an incoming request for a transaction is forwarded to another peer NoSQL Proxy that has more capacity to handle the request. In some examples, bloom filters and/or the like are used to determine as a pre-processing step to load balancing whether the data for the incoming request being analyzed is cached in the current NoSQL Proxy. When the data is not cached locally, the request becomes subject to load balancing and may be forwarded to a peer NoSQL Proxy that has capacity to do further calculations and handle the request.

9. a hybrid memory management unit (H-MMIU) that allows a flexible caching strategy where data may be stored using a combination of DRAM and SSD. In some examples, this allows access to cached data at DRAM latencies while allowing the H-MMU to determine appropriate reading and/or writing schedules to the SSD. In some examples, the H-MMU may also enable isolation of either DRAM or SRAM from SSD, so that data may be cached directly in SSD without also being cached in SRAM or DRAM. In some examples, this isolation supports the writing of temporary data to SRAM and not allowing other permanent data from polluting the SRAM that is crucial to achieving performance. In some examples, the bloom filter tables/vectors may be stored in the SRAM and perform fast checks on whether the said proxy has the specific data or not. Architecture and operation of embodiments of the H-MMU is further described in U.S. Pat. No. 9,286,221, which is hereby incorporated by reference in its entirety.

10. a compute block that supports regular expression (regex) evaluation, filtering, and/or the like. In some examples, the compute block supports libraries capable of extending a language framework such as node.js. In some examples, the compute block supports tight coupling with one or more processors on the FPGA and/or accessible to the NoSQL Proxy via the PCIe interface, and/or other interfaces. In some examples, an interface, such as QuickPath Interconnect (QPI) from Intel Corporation, accelerator coherence port (ACP) from ARM Ltd., Coherent Accelerator Processor Interface (CAPI) from IBM, and/or the like, allows data moves between the NoSQL Proxy and the one or more processors using L2/L3 cache and not via the PCIe bus. In some examples, a compilation of a domain-specific language, such as Ragel and/or the like, may be used to support descriptions of complex data filtering and classing using regular expressions, that will generate C code for operation on the one or more processors or that can alternative be compiled into an FPGA using a high-level synthesis compiler.

According to some embodiments, the NoSQL Proxy may receive a data command from application logic via the PCIe interface when the NoSQL Proxy is located in the application server or via the 10 GbE MAC network interface from either an application server (e.g., when the NoSQL Proxy is located in either the application server or the NoSQL data store) or from a peer NoSQL Proxy when the NoSQL Proxy has cached data for a command received by the peer NoSQL Proxy (e.g., as described in FIG. 8). In some examples, the command is then forwarded to the index converter so that data references in the command that each reference to a secondary index is converted to a corresponding primary index to make the ensuing data access requests more efficient. In some examples, the index conversion occurs as line rate so as not to introduce unwanted delays in the processing of the command. In some examples, the command is then passed to the data serdes engine to convert data in the command to the data format protocol of the NoSQL data store. In some examples, the protocol conversion occurs as line rate so as not to introduce unwanted delays in the processing of the command. The command is then processed using, for example, the method of FIG. 8. In some examples, the results of the command are then passed through a compute block for additional processing to support additional expression evaluation and/or filtering. In some examples, results of the command are then passed back through a data serdes engine to convert the results to the data format protocol of the application logic issuing the command. In some examples, the protocol conversion occurs as line rate so as not to introduce unwanted delays in the processing of the command. The results of the command are then passed back to the application logic.

Figure 10:
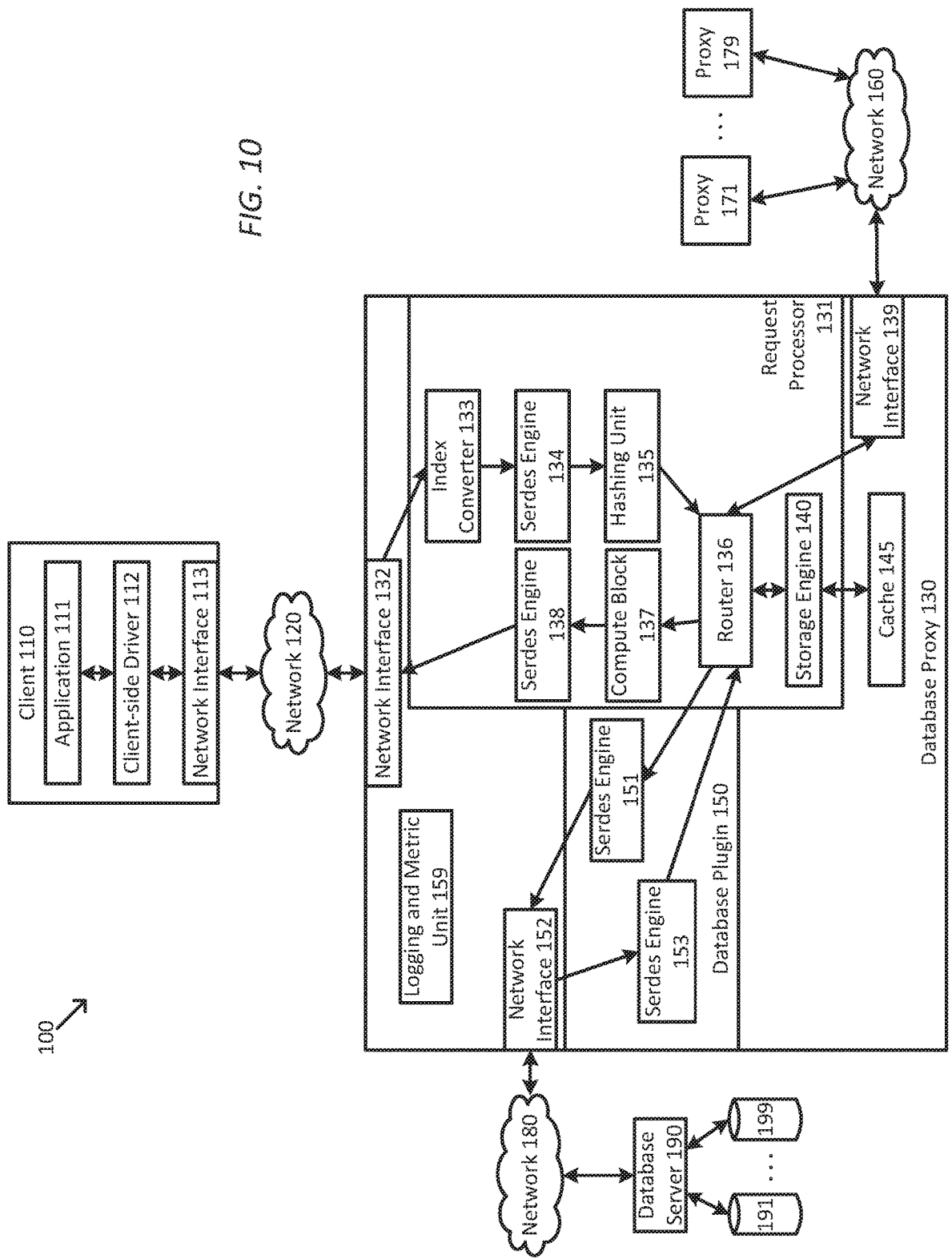
FIG. 10 is a simplified diagram of a data center architecture using database proxies according to some embodiments.

FIG. 10 is a simplified diagram of a data center architecture 100 using database proxies according to some embodiments. As shown in FIG. 10, data center architecture 100 is built around a multi-tier client-service model consistent with the data center architectures of FIGS. 1-6. Data center architecture 100 includes a client 110. And although only one client is shown in FIG. 10, data center architecture 100 may include any number of clients similar and/or different from client 110. In some embodiments, client 110 is consistent with the application servers of FIGS. 1-6. And although not shown in FIG. 10, client 110 may include one or more processors, memory, operating systems, virtual machines, and/or the like as would be understood by one of ordinary skill. As shown, client 110 includes an application 111, a client-side driver 112, and a network interface 113. Application 111 is representative of any of many possible applications that may need the storage services of a database and may correspond to an end-user application, an application in an application tier supporting a front end server, and/or the like.

Application 111 uses client-side driver 112 to take advantage of the database proxies in data center architecture 100. In some examples, client-side driver 112 may include an API that acts as an interface, such as a facade interface, between application 111 and the database proxies of data center architecture 100. In some examples, client-side driver 112 may provide access to functions typically found in database driver interfaces including support for functions such as query manipulation, connection management, authentication, query submission, query results handling, transactions, and/or the like. In some examples, the functionality of the client-side driver may be implemented as a REST API and/or a native API. In some examples, client-side driver 112 may be used in place of or as a supplement to one or more other database drivers usable by application 111 to access one or more database servers in data center architecture 100. In some examples, client-side driver 112 may also provide support for connection pooling between client 110 and the database proxies of data center architecture 100 so that when a communication connection between client 110 and a database proxy is requested, an existing connection in the connection pool may be used immediately without incurring the delay of establishing a new connection.

Network interface 113 provides connectivity between client 110 and/or client-side driver 112 and a network 120. Network 120 may correspond to any type of network including a local area network (such as an Ethernet), a wireless network, a data center network, a wide area network (such as the internet), and/or the like. Network 120 may include any number of network switching devices, bridges, hubs, routers, access points, gateways, and/or the like. Network interface 113 may include a combination of software drivers, firmware, hardware modules, and/or the like that provide network access and network services as would be expected in a network driver providing support for layered network systems such as TCP/IP, OSI, and/or the like. In some examples, network interface 113 may include physical layer support, medium access control (e.g., Ethernet, and/or the like), access to routing services (e.g., IP), access to delivery services (e.g., TCP, UDP, and/or the like), support for network management (e.g., ICMP, ARP, DHCP, and/or the like), one or more packet processors, one or more queues, one or more application layer APIs (e.g., HTTP, other REST APIs, and/or the like), security (e.g., IPSec, SSL, and/or the like), and/or the like.

Data center architecture 100 further includes a database proxy 130. In some embodiments, database proxy 130 is consistent with any of the database proxies of FIGS. 1-6 and 9. In some embodiments, database proxy 130 is a NoSQL proxy. As shown in FIG. 10, database proxy 130 includes several modules that may each individually and/or collectively be implemented using any suitable combination of hardware and/or software. In some embodiments, the components of database proxy 130 (as discussed in further detail below) may be implemented using any suitable combination of one or more central processing units, processors, multi-core processors, microprocessors, FPGAs, ASICs, SOCs, off the shelf components, boards, and/or the like; including, for example, a combination of one or more central processing units and FPGAs, a combination of one or more FPGAs and SOCs, and/or the like. As would be understood by one of ordinary skill, the one or more processors, multicore processors, microprocessors, and/or the like may be executing software stored in non-transitory machine-readable media (not shown). Some common forms of machine readable media that may include the processes and methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Database proxy 130 includes a request processor 131, a cache 145, a database plugin 150, a logging and metric unit 159, and several network interfaces 132, 139, and 152. Request processor 131 is responsible for the processing of database requests received through network interface 132 and/or network interface 139. Request process 131 is further responsible for sending database requests to database plugin 150 when the database request involves underlying database action and for sending database requests to other database proxies when those other database proxies are responsible for processing one or more portions of the database request. Request processor 131 further uses cache 145 for local and/or other cache storage. In some examples, cache 145 may be a persistent cache that stores data in non-volatile storage such as Flash/SSD.

Similar to network interface 113, network interface 132 may include a combination of software drivers, firmware, hardware modules, and/or the like that provide network access and network services as would be expected in a network driver provide support for layered network systems such as TCP/IP, OSI, and/or the like. In some examples, network interface 132 may include physical layer support, medium access control (e.g., Ethernet, and/or the like), access to routing services (e.g., IP), access to delivery services (e.g., TCP, UDP, and/or the like), support for network management (e.g., ICMP, ARP, DHCP, and/or the like), one or more packet processors, one or more queues, one or more application layer APIs (e.g., HTTP, other REST APIs, and/or the like), security (e.g., IPSec, SSL, and/or the like), and/or the like. Network interface 132 receives database requests from application 111 via client-side driver 112 and network 120. As each of the database requests is received, it is assigned a request identifier by request processor 131 to aid in tracking the database requests as they are processed by database proxy 130. In some examples, the identifier may correspond to a session identifier, connection identifier, and/or the like.

Request processor 131 includes an index converter 133. As database requests are received from client 110 via client-side driver 112 and network 120, the database requests are forwarded by network interface 132 to index converter 133. Index converter 133 provides support for translation of secondary indices included as part of each of the database requests to primary indices that are used to organize and store the database records cached by request processor 131. In some examples, the index converter 133 may operate at line rate so that the index conversion of the database read request does not slow down the pipeline of database requests being handled by request processor 131. In some examples, index converter 133 may use one or more lookup and/or cross-reference structures, such as one or more tables, to convert the database requests that reference data using one or more of the secondary indices to database requests that rely on the primary indices. For example, when a database request specifies a subset of data (e.g., via a "WHERE" clause or similar) using columns or fields that correspond to one of the secondary indices, index converter 133 modifies the database request to use the primary indices. In some examples, this index conversion allows for the data request to be completed using the more efficient primary indices. When a database request specifies data using just primary keys, the database request is passed through index converter 133 without change.

After being processed by index converter 133, the database requests are forwarded to a serdes engine 134. In some examples, serdes engine 134 may support various serdes protocols (e.g., JSON, ProtoBuf, Thrift, and/or the like). In some examples, the serdes engine 134 may operate at line rate so that the data protocol conversion of the database read request does not slow down the pipeline of database requests being handled by request processor 131. In some examples, serdes engine 134 is used to support conversion between the data formatting protocols used by application 111 to the data formatting protocols used by request processor 131. This allows the other modules of request processor 131 to operate natively in their preferred data formatting protocol without having to perform separate conversion of the data formatting protocols of application 111. For example, when a database request includes data in the JSON format and request processor 131 works natively in the BSON format, serdes engine 134 converts the JSON formatted data objects to BSON formatted data objects. When a database request includes data already in the native format of request processor 131, the database request is passed through serdes engine 134 without change.

After being processed by index converter 133 and/or serdes engine 134, the database requests are forwarded to a hashing unit 135. Hashing unit 135 examines the primary index, range of primary indices, and/or set of primary indices included in a database request and applies a hashing function to each index to determine a fixed-length hash value for each index. In some examples, the hashing function may be any suitable hashing function, such as a cyclic redundancy check, a checksum, a universal hash, a non-crytographic hash, and/or the like. In some examples, the structure of the hashing function and how it hashes each of the indices is based on how request processor 131 organizes and/or retrieves data. In some examples, when request processor 131 organizes and/or retrieves data consistent with a columnar data format, such as the columnar data format of Apache Cassandra, the hashing function may be applied to a key space, a table identifier, and/or a key or primary index value from the database request. When the database request includes a range of primary indices and/or a group of primary indices, the hashing function may be applied multiple times to different index values to determine a series of hash values corresponding to the database request. In some examples, other database formats may be used with different hashing functions. The one or more hash values are then forwarded to a router 136 for further processing.

In some embodiments, router 136 corresponds to the proxy finite state machine, configuration and coordination engine, and/or the load balancer of FIG. 9. Router 136 determines the one or more locations where the data requested and/or identified by each database request is stored based on the one or more hash values provided by hashing unit 135 for the database request. Router 136 examines each of the hash values to determine whether the hash value falls within a range of hash values that are the responsibility of database proxy 130 or one of the other database proxies 171-179 forming a proxy cluster with database proxy 130. In some examples, the set of possible hash values are divided into a plurality of hash value ranges with each of database proxy 130 and database proxies 171-179 being responsible for one or more of the hash value ranges. In some examples, the hash values may be mapped according to a consistent hashing and/or similar arrangement where the set of possible hash values are mapped to a circular space with each of database proxy 130 and database proxies 171-179 being assigned to one or more angular ranges within the circular space. In some examples, the division of hash values among database proxy 130 and the one or more other database proxies 171-179 supports load balancing among database proxy 130 and the one or more other database proxies 171-179.

Router 136 then makes a determination, for each hash value, whether further processing of data associated with that hash value is to be performed by database proxy 130 or one of the other database proxies 171-179. When the hash value corresponds to one of the ranges of hash values assigned to database proxy 130, database proxy 130 accesses the data associated with the hash value. When the hash value corresponds to one of the ranges of hash values associated with a hash value of one or the other database proxies 171-179, the processing of the data associated with the hash value is forwarded to a corresponding one of the other database proxies 171-179 that is assigned the hash value. The database request with the hash value is forwarded to the corresponding one of the other database proxies 171-179 using network interface 139. When the corresponding one of the other database proxies 171-179 finishes processing of the forwarded database request, the other database proxy 171-179 returns results and/or a response to router 136 through network interface 139.

Network interface 139 is similar to network interfaces 113 and/or 132 and provides interconnectivity with each of the other database proxies 171-179 via a network 160 that is similar to network 120. In some examples, each of the other database proxies 171-179 may be substantially similar to database proxy 130 and may receive the forwarded database request on a corresponding network interface 139. In some examples, network interface 139 may provide connection pooling with the corresponding network interfaces 139 in each of the other database proxies 171-179. And although FIG. 10 shows two other database proxies 171 and 179, any number of other database proxies is possible including one, three, and/or four or more.

Referring back to router 136. When router 136 determines that the hash value is assigned to database proxy 130, router 136 examines the database request to determine whether it is a read, a write, an update, or a delete request. When the database request is a read request, router 136 uses a storage engine 140 to determine whether a local copy of the associated data is stored in cache 145. In some examples, the hash value determined by hashing unit 135 may be used by storage engine 140 as an index into cache 145 and a determination is made whether the associated data is stored in cache 145 by looking up hash value in cache 145. In some examples, when the hash value is not used as an index by cache 145, storage engine 140 and/or cache 145 may compute a different hash and use that to determine whether the associated data is stored in cache 145. When the associated data is stored in cache 145, it is retrieved from cache 145 by storage engine 140 and returned to router 136 as results for the database request. In some examples, storage engine 140 and/or cache 145 may use any suitable data replacement policy, such as least-recently use, least-frequently used, and/or the like. In some embodiments, storage engine 140 includes an H-MMU, which is further described in U.S. Pat. No. 9,286,221, which is hereby incorporated by reference in its entirety. In some embodiments, storage engine 140 overlays one or more higher-order data models onto cache 145 that provide support for various NoSQL database types. In some examples, the one or more higher-order models may include columnar (such as used by Apache Cassandra), graph, document store, and/or other suitable data formats.

When the database request is a write request, the hash value (or other index used by storage engine 140 and/or cache 145) is used to store the results in cache 145 and then a copy is written to an underlying database using a database plugin 150. When the database request is a delete request, the hash value (or other index used by storage engine 140 and/or cache 145) is used to delete the corresponding data from cache 145 if a copy is stored in cache 145 and database plugin 150 is used to delete the corresponding data from the underlying database. When the database request is an update request, the hash value (or other index used by storage engine 140 and/or cache 145) is used to update the corresponding data in cache 145 if the corresponding data is already stored in cache 145 or to store the corresponding data in cache 145 if the corresponding data in not already stored in cache 145. A copy is then written to the underlying database using database plugin 150. In some examples, a write, update, and/or a delete request is forwarded to the underlying database by database plugin 150 consistent with the writing policy of the underlying database, whether that is a write-back and/or a write-through policy.

When a database request is associated with multiple hash values, router 136 subdivides the database request into a series of database sub-requests corresponding to each of the hash values. Each of the sub-requests and associated hash values is then processed separately by router 136 using storage engine 140, cache 145, database plugin 150, and/or one of the other database proxies 171-179. Router 136 then collects the sub-results and/or sub-responses associated with each of the hash values into composite results and/or a composite response. In some examples, tracking of the various sub-requests and sub-results may be managed by tagging each of the sub-requests and sub-results with the request identifier assigned to the originating database request when it was received by request processor 131.

After the results and/or response to the database query is assembled by router 136, the results and/or response are forwarded to a compute block 137. Compute block 137 provides support for regular expression evaluation, filtering, and/or the like that may be included as part of the database request. In some examples, compute block 137 may provide support for compression, encryption, and/or similar functions. In some examples, compute block 137 supports libraries capable of extending a language framework such as node.js, via support of stored procedures, and/or the like. In some examples, compute block 137 may be implemented via a compilation of a domain-specific language, such as Ragel and/or the like, which may be used to support descriptions of complex data filtering and classing using regular expressions, that will generate C code for operation on the one or more processors or that can alternatively be compiled into an FPGA using a high-level synthesis compiler. When the results and/or response are not subject to expression, filtering, and/or the like as part of the database request, the results and/or response are passed through compute block 137 without change.

The results and/or response are then forwarded to a serdes engine 138 in further preparation for returning the results and/or response to requesting application 111. In some examples, serdes engine 138 is similar to serdes engine 134 and is responsible for converting data objects from the data formatting protocol used by request processor 131 to the data formatting protocol used by application 111. When application 111 and request processor 131 use the same data formatting protocols and/or the results and/or response do not include any data objects, the results and/or response are passed through serdes engine 138 without change.

After processing by serdes engine 138, the results and/or response are passed back to application 111 by network interface 132. In some examples, correct delivery of the results and/or response to application 111 is managed using the request identifier assigned to the originating database request when it was received by database proxy 130.

Database plugin 150 is selected from a series of possible database plugins depending upon the type of the underlying database as each underlying database typically uses different query languages, data formatting protocols, writing policies (write-back and/or write-through), transaction policies, underlying architectures, and/or the like. In some examples, the types of underlying database supported by database plugin 150 may include Apache Cassandra, Mongo, Hbase, Hadoop, and/or the like. Database plugin 150 includes a serdes engine 151 that is similar to serdes engine 134 and/or serdes engine 138. Serdes engine 151 is responsible for converting data objects from the data formatting protocol used by database proxy 130 to the data formatting protocol used by the underlying database. When the underlying database and request processor 131 use the same data formatting protocols and/or the database request does not include any data objects, the database request is passed through serdes engine 151 without change.

After processing by serdes engine 151, the database request is forwarded to network interface 152 for delivery to a database server 190 for the underlying database. Database server 190 provides access to one or more databases 191-199 that form the underlying database. Network interface 152 is similar to network interfaces 113, 132, and/or 139 and provides interconnectivity with database server 190 via a network 180 that is similar to network 120 and/or 160. In some examples, network interface 152 and database plugin 150 may access database server 190 using one or more APIs of database server 190. In some examples, network interface 152 may provide connection pooling with a network interface (not shown) in database server 190. And although FIG. 10 shows a single database server, database plugin 150 is capable of communicating with two or more database servers.

After database server 190 returns a response to the database request (either as results of a read or status of a write, update, or delete) to database plugin 150 via network interface 152, the results and/or response are forwarded to a serdes engine 153 that is similar to serdes engine 134, 138, and/or 151. Serdes engine 153 is responsible for converting data objects from the data formatting protocol used by the underlying database to the data formatting protocol used by database proxy 130. When the underlying database and database proxy 130 use the same data formatting protocols and/or the results and/or response do not include any data objects, the results and/or response are passed through serdes engine 153 without change.

After processing by database plugin 150, the results and/or response are returned to router 136 where they may be combined with other results and/or responses for return to application 111 as described above. When the results are in response to a database read request, the results may be stored in cache 145 as previously discussed.

Logging and metric unit 159 provides logging and analytics support for database proxy 130. In some examples, logging and metric unit 159 provides one or more logs supporting by one or logging APIs that the other units of database proxy 130 (e.g., request processor 131, network interface 132, index converter 133, serdes engine 134, hashing unit 135, router 136, compute block 137, serdes engine 138, network interface 139, storage engine 140, cache 145, serdes engine 151, network interface 152, and/or serdes engine 153) may use to log their respective activities as they handle database requests. In some examples, the one or more logs may be used to track database requests, debug the processing of requests, and/or the like. In some examples, the one or more logs may be accessed by clients (such as client 110 and/or application 111) and/or administrators to monitor the activities of database proxy 130. In some examples, logging and metric unit 159 may provide one or more analytics engines that may determine one or more performance metrics (e.g., throughput, latency, utilization, cache capacity, hit rates, and/or the like) and/or one or more operational statistics. In some examples, the one or more performance metrics and/or the one or more operational statistics may be accessed by clients (such as client 110 and/or application 111) and/or administrators via one or more APIs. In some examples, one or more of the entries in the one or more logs, the one or more performance metrics, and/or the one or more operational statistics may be accessed and/or shared using network interface 132.

As discussed above and further emphasized here, FIG. 10 is merely an example which should not unduly limit the scope of the claims. One of ordinary skill in the art would recognize many variations, alternatives, and modifications. In some embodiments, database proxy 130 may further include more than one database plugin to support the forwarding of database requests to multiple database servers, to support database servers of different types, and/or the like.

In some embodiments, different interconnections are possible between client 110, database proxy 130, the other database proxies 171-179, and/or database server 190. In some examples, any two or more of network interface 132, network interface 139, and/or network interface 180 may be combined so that the same hardware and/or software modules may be usable by database proxy 130 to communicate with client 110, the other database proxies 171-179, and/or database server 190. In some examples, the decision whether to use separate or combined network interfaces may be based on balancing between the extra throughput of parallelism versus fewer circuits and/or modules within database proxy 130. In some examples, whether to use separate or combined network interfaces may depend on the number of network ports, buffer sizes, and/or the like supported by network interfaces 132, 139, and/or 152. Similarly, any two or more of network 120, 160, and/or 180 may be a same network.

In some embodiments, one or more of the interconnections between database proxy 130 and client 110, the other database proxies 171-179, and/or database server 190 may be implemented using local port connections, buses, and/or the like rather than network connections. In some examples, when database proxy 130 is installed in client 110 (such as in the embodiments of FIG. 5), database proxy 130 may be interconnected to the rest of client 110 using one or more ports, one or more buses, and/or the like. In some examples, database proxy 130 and/or one or more of the other database proxies 171-179 may be optionally mounted in a same chassis allowing interconnect between database proxy 130 and the one or more of the other database proxies 171-179 through a mid-plane and/or back-plane connection mechanism. In some examples, when database proxy 130 is installed in database server 190 (such as in the embodiments of FIGS. 3, 4, and/or 6), database proxy 130 may be interconnected to the rest of database server 190 using one or more ports, one or more buses, and/or the like. In some embodiments, the one or more ports and/or one or more buses may be PCIe buses, QuickPath Interconnects, accelerator coherence ports, advanced microcontroller bus architecture (AMBA) buses, and/or the like.

Figure 11:
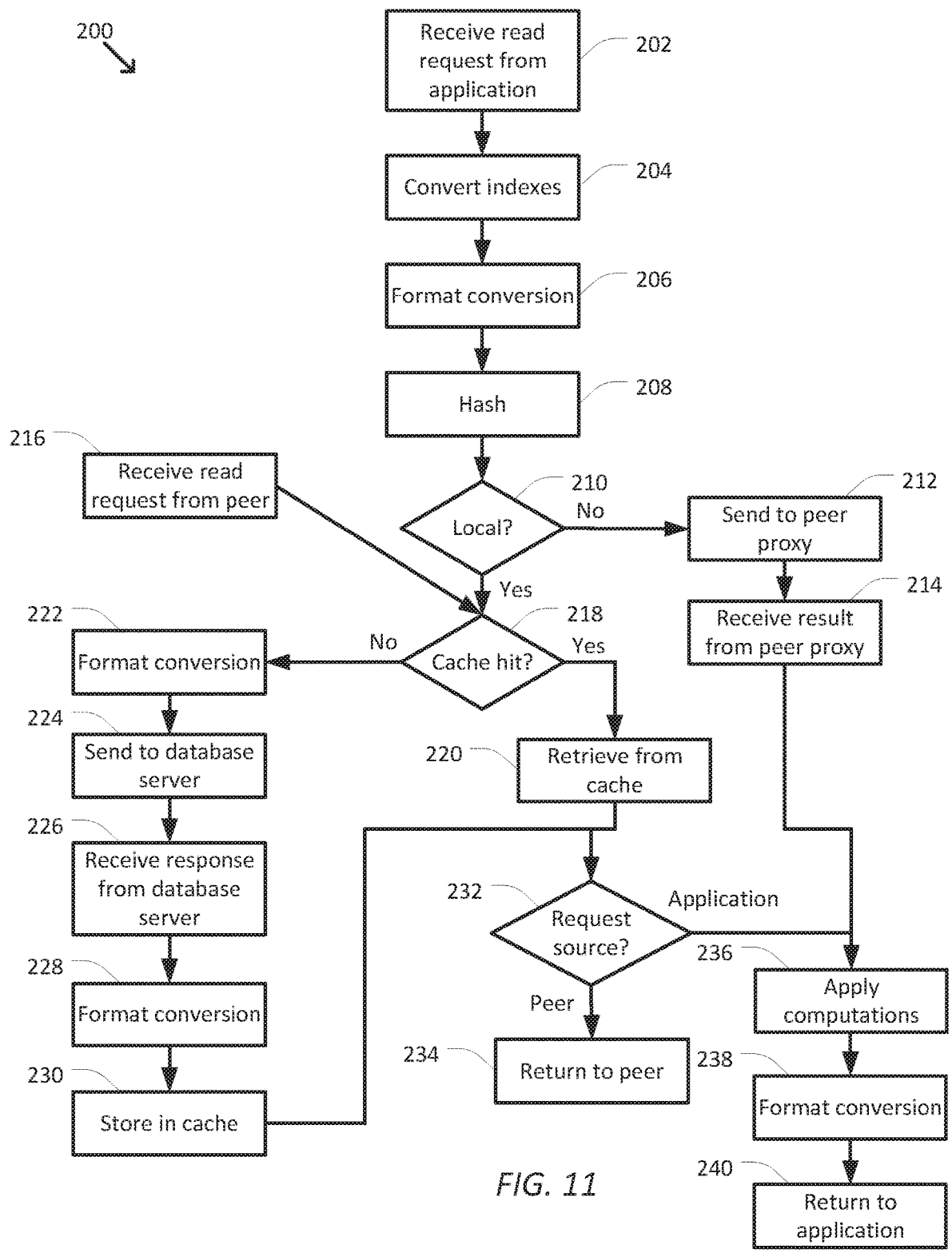
FIG. 11 is a simplified diagram of a method of handling read requests using database proxies according to some embodiments.

FIG. 11 is a simplified diagram of a method 200 of handling read requests using database proxies according to some embodiments. One or more of the processes 202-240 of method 200 may be implemented, at least in part, in the form of executable code stored on non-transient, tangible, machine readable media that when run by one or more processors (e.g., one or more processors of database proxy 130) may cause the one or more processors to perform one or more of the processes 202-240. In some embodiments, one or more of the processes 202-240 of method 200 may be implemented, at least in part, using one or more hardware modules including one or more ASICs, one or more FPGAs, and/or the like. In some embodiments, method 200 is usable to receive and process database read requests sent to a database proxy, such as database proxy 130 and/or any of the other database proxies 171-179, from an application, such as application 111. The ordering of processes 202-240 in FIG. 11 is exemplary only and other possible orderings and/or arrangements of processes 202-240 are possible. In some examples, one or more of processes 202-240 may be performed concurrently. In some embodiments, processes 208-214, 218-232, 236, and/or 238 may be performed multiple times when a database request involves data associated with multiple hash values. In some embodiments, one or more of processes 204, 206, 222, 228, 236, and/or 238 may be optional and can be omitted. In some embodiments, other processes not shown in FIG. 11 may also be part of method 200. In some embodiments, method 200 is consistent with the method and processes of FIG. 8.

At a process, 202 a database read request is received from an application. In some examples, the database read request may be received by a database proxy, such as database proxy 130, from an application, such as application 111, via an interface, such as network interface 132. The database read request may be in the form of a query in a standard query language, such as Cassandra query language and/or the like, and may include a request for one or more entries and/or fields stored in the database being supported by the database proxy. In some examples, the database read request may be received using one or more API calls invoked by the application and/or a client-side driver, such as client-side driver 112, used to access the database through the database proxy. In some examples, the database read request may be assigned a request identifier, such as a session identifier, connection identifier, and/or the like so that the database read request may be tracked throughout method 200.

At an optional process 204, any secondary indices used in the database read request are converted to primary indices by an index converter, such as index converter 133. In some examples, the index conversion may include using one or more lookup and/or cross-reference structures, such as one or more tables, to convert the secondary indices in the database read request received during process 202 to primary indices. In some examples, the index conversion may occur at line rate so as not to slow down the pipeline of database requests being handled by the database proxy. When the database read request specifies data using just primary keys, process 204 may be omitted.

At an optional process 206, data objects in the database read request that are not in data formatting protocols used by the database proxy are converted to data formatting protocols used by the database proxy using a serdes engine, such as serdes engine 134. In some examples, the format conversion may occur at line rate so as not to slow down the pipeline of database requests being handled by the database proxy. When the database read request does not include data objects in a data formatting protocol that are not natively supported by the database proxy, process 206 may be omitted.

At a process 208, the database entries referenced by the database read request are hashed by a hashing unit, such as hashing unit 135. The hashing unit examines the primary index, range of primary indices, and/or set of primary indices included in the database read request and applies a hashing function to each index to determine a fixed-length hash value for each index. When the database request includes a range of primary indices and/or a group of primary indices, the hashing function may be applied multiple times to difference index values to determine a series of hash values corresponding to the database read request. Each of the hash values determined during process 208 is then passed on to the other processes of method 200 for further handling as a separate database read request (i.e., a sub-request).

At a process 210, it is determined whether the hash value corresponds to a hash value assigned to the database proxy (i.e., locally) or to another database proxy (peer proxy) in the system. In some examples, the hash value may be compared to one or more ranges of hash values assigned to the local database proxy to determine whether the local database proxy is going to handle the database read associated with the hash value or whether the database read request is to be forwarded to one of the peer database proxies for handling. In some examples, when the hash value is assigned to one of the peer database proxies, the peer database proxy is identified based on the one or more ranges of hash values assigned to that peer database proxy. When the hash value is assigned to the local database proxy, the portion of the database read request corresponding to the hash value is forwarded to process 218 for further handling. When the hash value is assigned to one of the peer database proxies, the portion of the database read request corresponding to the hash value is forwarded to process 212 for further handling.

At the process 212, the portion of the database read request corresponding to the hash value is sent to the appropriate peer database proxy. In some examples, the portion of the database read request corresponding to the hash value may be forwarded to the peer database proxy via an interface, such as network interface 139. In some examples, to aid in tracking the database read request, the request identifier may be sent along with the portion of the database read request sent to the peer database proxy and/or associated with the connection used to send the portion of the database read request to the peer database proxy. In some examples, use of the request identifier allows for the portion of the database read request to be sent and the results received without the sending and/or receiving having to occur in a strict order.

At a process 214, when the peer database proxy completes processing of the portion of the database read request (e.g., to retrieve the data requested by the portion of the database read request), the results are returned from the peer database proxy to the local database proxy. In some examples, the request identifier included in the received results and/or associated with the connection to the peer database proxy may be used to associate the results with the database read request received during process 202 and without having to receive the results in any strict order. Once the results are received they are further processed beginning with a process 236.

As an alternative to processes 202-214, at a process 216, the database read request is received from a peer database proxy. In some examples, the database read request may be received from the peer database proxy as a counterpart to a corresponding send process, such as process 212, in the peer database proxy. Because the database read request has been partially processed by the peer database proxy and the corresponding hash value has been determined to belong to the local database proxy, the database read request may be handled without having to use processes 202-210. In some examples, the database read request may be assigned a request identifier. Once received, the database read request is passed to process 218 for further handling.

At the process 218, it is determined whether the data corresponding to the hash value has been previously retrieved and is stored in a local cache, such as cache 145. When the data corresponding to the hash value is stored in the local cache (i.e., a hit occurs), the database read request is passed to the process 220 for further processing. When the data corresponding to the hash value is not stored in the local cache (i.e., a miss occurs), the database read request is passed to a database plugin, such as database plugin 150, for further processing beginning with a process 222.

At the process 220, the data corresponding to the hash value is retrieved from the cache using a storage engine, such as storage engine 140. The retrieved data is then passed to a process 232 for further handling.

At the optional process 222, data objects in the database read request that are not in data formatting protocols used by the underlying database are converted to data formatting protocols used by the underlying database using a serdes engine, such as serdes engine 151. In some examples, the format conversion may occur at line rate so as not to slow down the pipeline of database requests being handled by the database proxy and/or the database plugin. When the database read request does not include data objects in a data formatting protocol that are not supported by the underlying database, process 222 may be omitted.

At a process 224, the database read request is sent to a database server associated with the underlying database, such as database server 190, for further handling. In some examples, the database read request corresponding to the hash value may be forwarded to the database server via an interface, such as network interface 152. In some examples, to aid in tracking the database read request, the request identifier may be sent along with the database read request sent to the database server and/or associated with the connection used to send the database read request to the database server. In some examples, use of the request identifier allows for the database read request to be sent and the results received without the sending and/or receiving having to occur in a strict order.

At a process 226, when the database server completes processing of the database read request (e.g., to retrieve the data requested by the database read request from the underlying database), the results are returned from the database server to the database plugin. In some examples, the request identifier included in the received results and/or associated with the connection to the database server may be used to associate the results with the database read request received during process 202 and without having to receive the results in any strict order.

At an optional process 228, data objects in the results from the database server that are not in data formatting protocols used by the database proxy are converted to data formatting protocols used by the database proxy using a serdes engine, such as serdes engine 153. In some examples, the format conversion may occur at line rate so as not to slow down the pipeline of database requests being handled by the database proxy and/or the database plugin. When the results do not include data objects in a data formatting protocol that are not natively supported by the database proxy, process 228 may be omitted.

At a process 230, the results from the database server are stored in the cache. This allows subsequent requests for the data corresponding to the results to be more quickly retrieved using process 220 as a cache hit in a subsequent request for the same data. In some examples, when there is no space in the cache to store the results, one or more values in the cache may be replaced using any suitable cache replacement policy, such as least-recently used, least-frequently used, and/or the like. After the results are stored in the cache, the results are further processed using process 232.

At the process 232, the original source of the database read request is determined as that determines to where the results are to be sent. When the database read request came from a peer database proxy via process 216, the results are returned to the peer database proxy using a process 234. When the database read request came from an application via process 201, the results are returned to the application beginning with a process 236. However, in some embodiments, when the hashing of process 208 resulted in splitting the database read request into multiple sub-requests, the results of each of the sub-requests may be gathered and/or combined into a single set of results to be returned to the application beginning with process 236.

At the process 234, the results are returned to the peer database proxy that sent the database read request during process 216. In some examples, the request identifier assigned to the database read request during process 216 may be used to return the results to the correct peer database proxy. In some examples, the database read request may be returned to a corresponding process 214 of the peer database proxy. Once the results are returned to the peer database proxy, processing of the database read request is complete.

At the optional process 236, the results of the database read request are processed using a compute block, such as compute block 137. In some examples, the compute block may apply any regular expression, filter, compression, encryption, stored procedure, and/or the like specified in the database read request to the results of the database read request. When the results are not subject to computation as part of the database read request, process 236 may be omitted.

At an optional process 238, data objects in the results that are not in data formatting protocols used by the application are converted to data formatting protocols used by the application using a serdes engine, such as serdes engine 138. In some examples, the format conversion may occur at line rate so as not to slow down the pipeline of database requests being handled by the database proxy. When the results do not include data objects in a data formatting protocol that are not supported by the application, process 238 may be omitted.

At a process 240, the results are returned to the application using the interface used to receive the database read request during process 202. In some examples, the request identifier assigned to the database read request during process 202 may be used to return the results using the same connection on which the database read request was received. In this way, the results may be returned to the appropriate place in the application. Once the results are returned to the application, processing of the database read request is complete.

Figure 12:
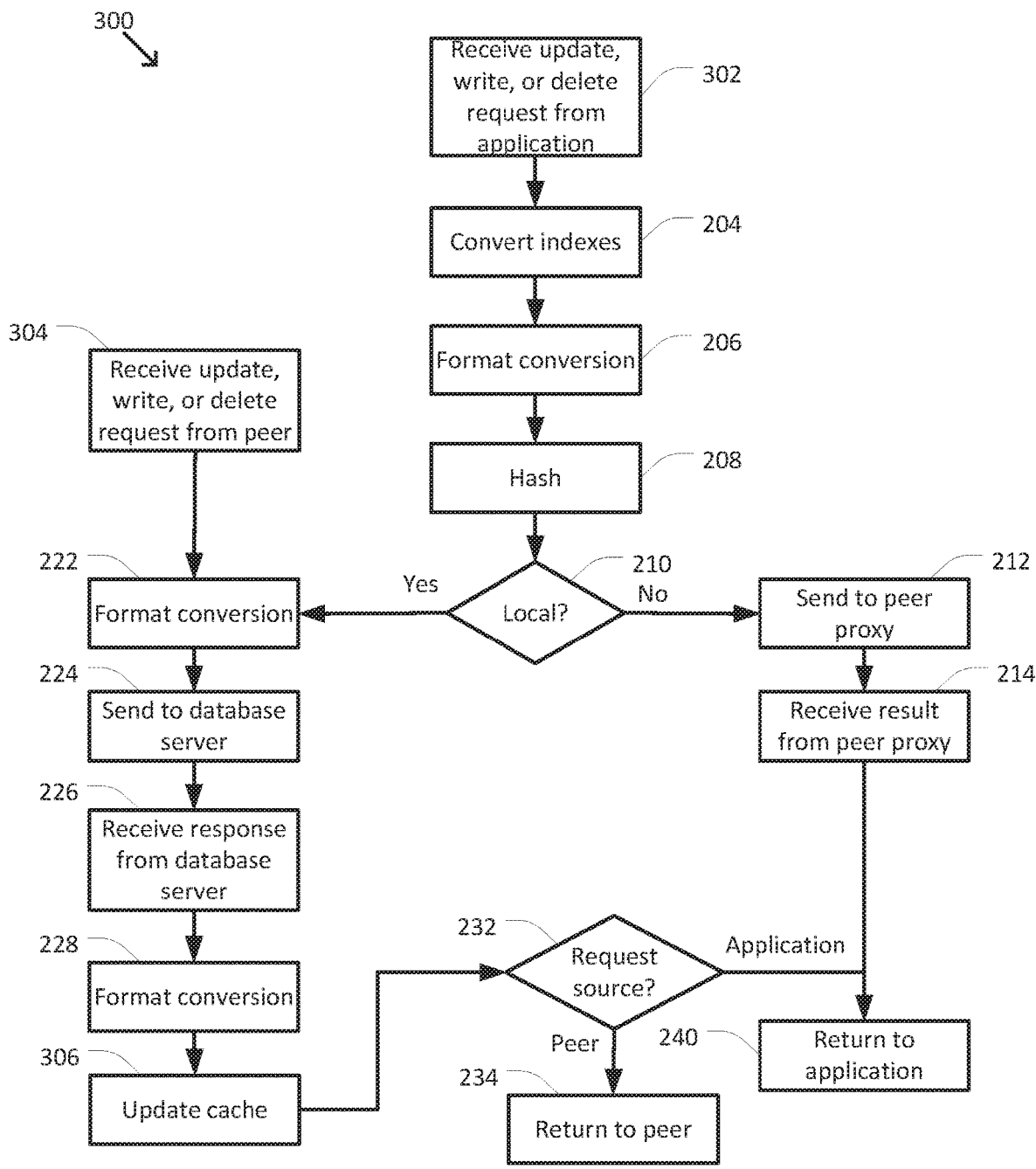
FIG. 12 is a simplified diagram of a method of handling update, write, or delete requests using database proxies according to some embodiments.

FIG. 12 is a simplified diagram of a method 300 of handling update, write, or delete requests using database proxies according to some embodiments. One or more of the processes 302, 204-214, 304, 222-228, 306, 232, 234, and 240 of method 300 may be implemented, at least in part, in the form of executable code stored on non-transient, tangible, machine readable media that when run by one or more processors (e.g., one or more processors of database proxy 130) may cause the one or more processors to perform one or more of the processes 302, 204-214, 304, 222-228, 306, 232, 234, and 240. In some embodiments, one or more of the processes 302, 204-214, 304, 222-228, 306, 232, 234, and 240 of method 300 may be implemented, at least in part, using one or more hardware modules including one or more ASICs, one or more FPGAs, and/or the like. In some embodiments, method 300 is usable to receive and process database write, update, and delete, requests sent to a database proxy, such as database proxy 130 and/or any of the other database proxies 171-179, from an application, such as application 111. The ordering of processes 302, 204-214, 304, 222-228, 306, 232, 234, and 240 in FIG. 12 is exemplary only and other possible orderings and/or arrangements of processes 302, 204-214, 304, 222-228, 306, 232, 234, and 240 are possible. In some examples, process 306 may be performed before and/or concurrently with processes 222-228. In some examples, one or more of processes 302, 204-214, 304, 222-228, 306, 232, 234, and 240 may be performed concurrently. In some embodiments, processes 210-214, 304, 222-228, 306, 232, 234, and/or 240 may be performed multiple times when a database request involves data associated with multiple hash values. In some embodiments, one or more of processes 204, 206, 222, and/or 228 may be optional and can be omitted. In some embodiments, other processes not shown in FIG. 12 may also be part of method 300. In some embodiments, method 300 is consistent with the method and processes of FIG. 8.

At a process, 302 a database write, update, or delete request is received from an application. In some examples, the database write, update, or delete request may be received by a database proxy, such as database proxy 130, from an application, such as application 111, via an interface, such as network interface 132 using a process similar to process 202. The database write, update, or delete request may be in the form of a query in a standard query language, such as Cassandra query language and/or the like, and may include a write, update, or delete request for one or more entries and/or fields stored in the database being supported by the database proxy. In some examples, the database write, update, or delete request may be received using mechanisms and/or processes similar to those discussed with respect to process 202. In some examples, the database write, update, or delete request may be assigned a request identifier, such as a session identifier, connection identifier, and/or the like so that the database write, update, or delete request may be tracked throughout method 300.

The database write, update, or delete request is then processed using processes 204-208 in much the same fashion as database read requests are handled by the corresponding processes in method 200. At the process 210, each of the hash values determined during process 208 is examined to determine whether the hash value is assigned to one of the one or more ranges of hash values assigned to the local database proxy. When the hash value is assigned to the local database proxy, the database write, update, or delete request is passed to process 222 for further handling. When the hash value is assigned to a peer database proxy, the database write, update, or delete request is sent to the peer database proxy for handling using processes 212 and 214 in much the same way as database read requests are handled by processes 212 and 214 in method 200.

As an alternative to processes 302 and 204-214, at a process 304, the database write, update, or delete request is received from a peer database proxy. In some examples, the database write, update, or delete request may be received from the peer database proxy as a counterpart to a corresponding send process, such as process 212, in the peer database proxy in much the same way database read requests are received during process 216 of method 200. In some examples, the database write, update, or delete request may be assigned a request identifier. Once received, the database write, update, or delete request is passed to process 222 for further handling.

The database write, update, or delete request is then processed using processes 222-228 in much the same fashion as database read requests are handled by the corresponding processes in method 200. This allows the database write, update, or delete request to be reflected in the data stored in the underlying database. In some examples, the database write, update, or delete request may be processed according to the write polity (e.g., write-through or write-back) of the database plugin and/or the underlying database.

At a process 306, the database write, update, or delete request is applied to the cache. This allows subsequent requests for the data corresponding to the database write, update, or delete request to be more quickly retrieved using process 220 as a cache hit in a subsequent request for the same data using method 200. When the database request is a write request, the hash value (or other index used by the cache) is used to store the data specified by the database write request in the cache. When the database request is a delete request, the hash value (or other index used by the cache) is used to delete the corresponding data from the cache if a copy is stored in the cache. When the database request is an update request, the hash value (or other index used by the cache) is used to update the corresponding data in the cache if the corresponding data is already stored in the cache or to store the corresponding data in the cache if the corresponding data in not already stored in the cache. In some examples, when there is no space in the cache to store the update, one or more values in the cache may be replaced using any suitable cache replacement policy, such as least-recently used, least-frequently used, and/or the like.

After the database write, update, or delete request is used to update the cache during process 306, the response from the database write, update, or delete request is further processed using processes 232, 234, and 240 in much the same manner as the same processes in method 200. In some examples, because database write, update, and/or delete requests do not typically return results, a response (typically in the form of success or failure) is returned to the peer database proxy or application as appropriate. Once the response is returned by process 234 or 240, processing of the database write, update, or delete request is complete.

Figure 13:
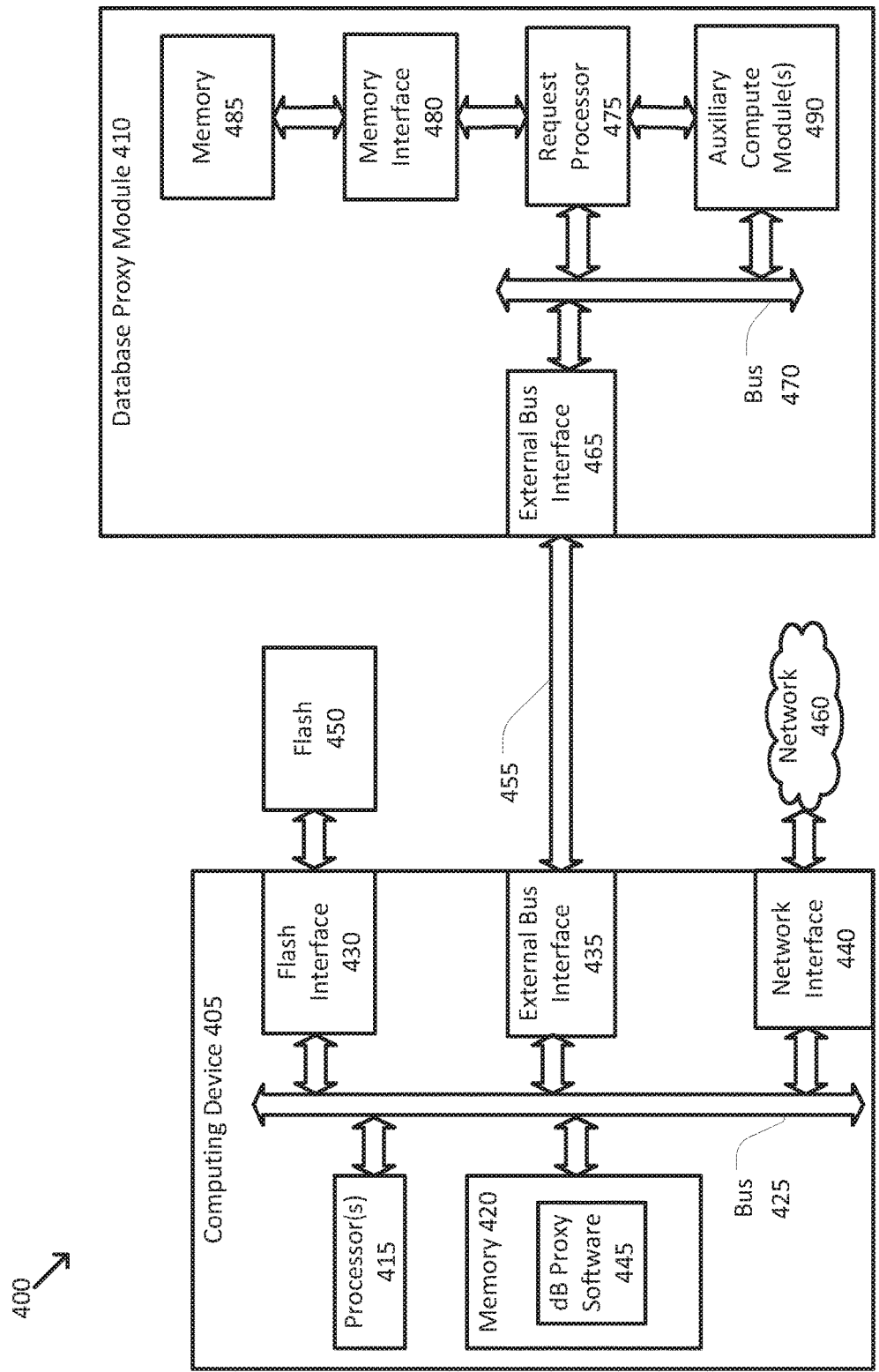
FIGS. 13-15 are simplified diagrams of different configurations for a database proxy according to some embodiments.
Figure 14:
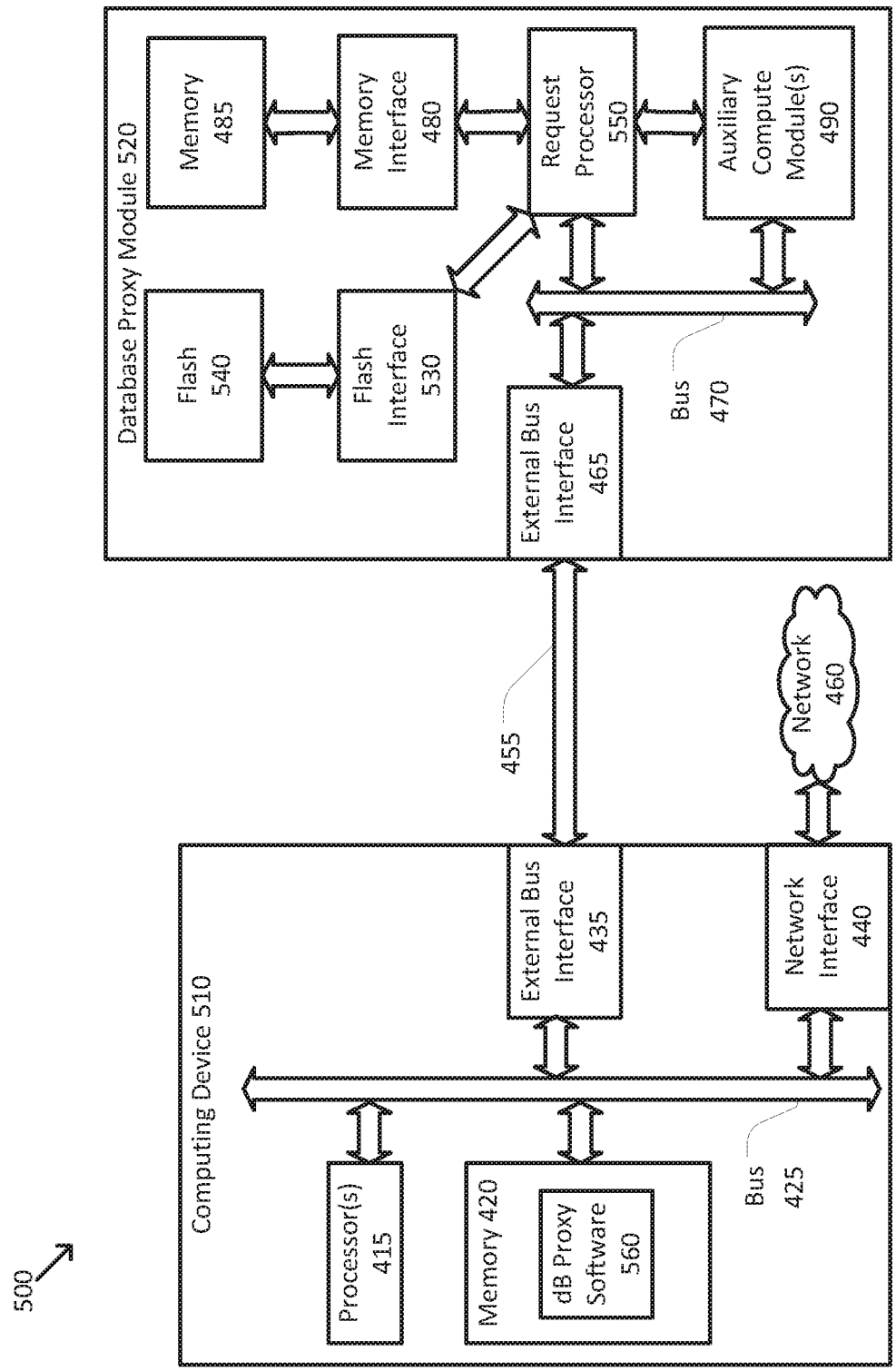
Figure 15:
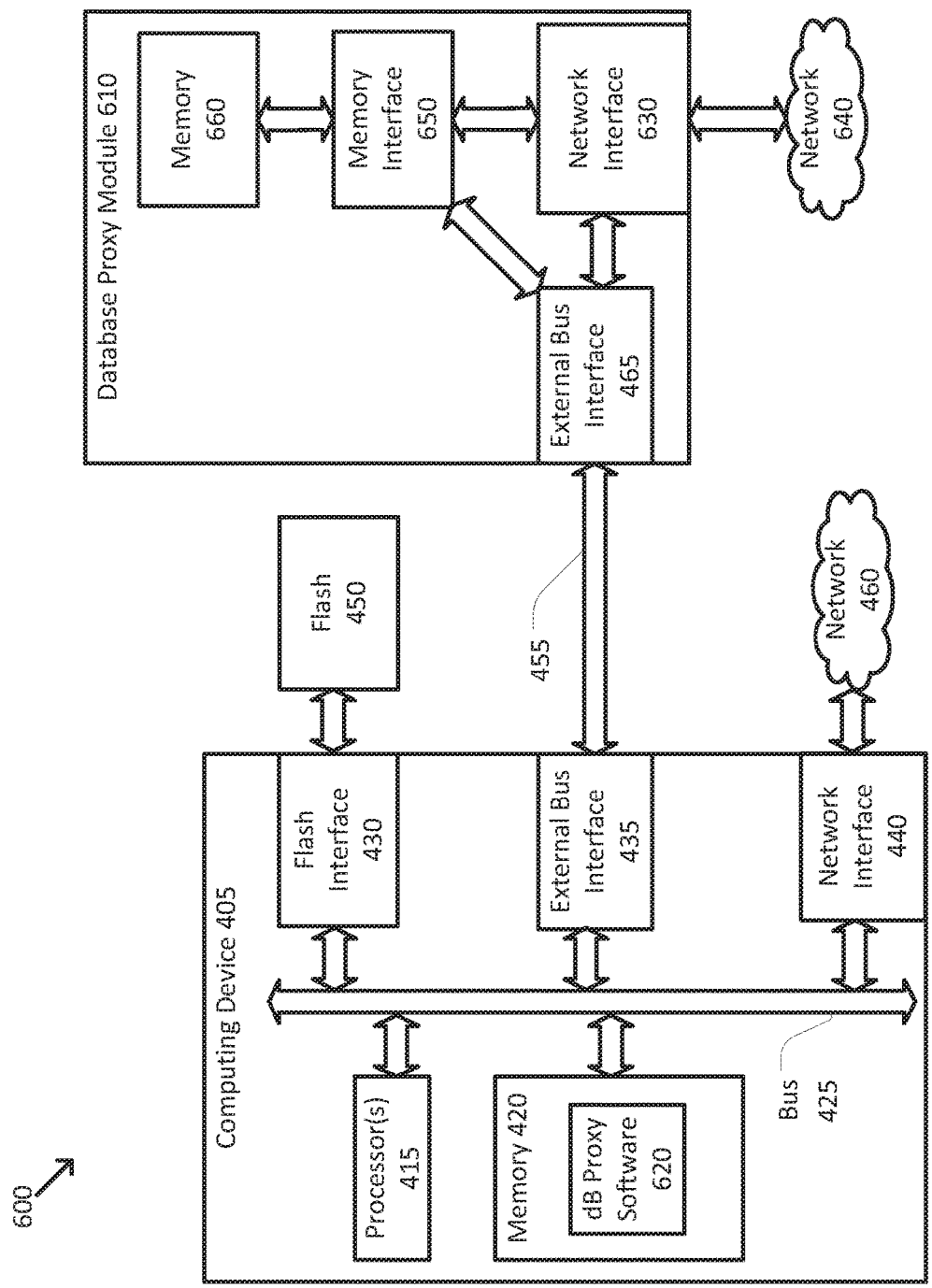

As discussed above with respect to FIG. 10, the data center architecture 100 includes database proxy 130, which is described in terms of the functional units used to implement database proxy 130. According to some embodiments, database proxy 130 may be implemented using any one of several possible architectures and/or configurations, such as a single-chip device, a system on a chip, a set of stacked chips, a computing device with one or more boards, a set of stacked boards, and/or the like. FIGS. 13-15 are simplified diagrams of non-limiting examples of different configurations for a database proxy according to some embodiments.

As shown in FIG. 13, a database proxy 400 includes a computing device 405 and a database proxy module 410 shown as separate units. In some examples, computing device 405 and database proxy module 410 may be implemented as a system on a chip (such as a FPGA with an embedded processor), separate chips on a chip stack, separate boards in a computing device (e.g., as a set of stacked boards, boards in a card cage, and/or the like), and/or the like. In some examples, database proxy 400 is consistent with the database proxy of FIG. 9 and/or database proxy 130.

As further shown in FIG. 13, computing device 405 includes one or more processors 415, memory 420, an internal bus 425, an optional flash memory interface 430, an external bus interface 435, and a network interface 440. The one or more processors 415 are coupled to internal bus 425 so as to be able to communicate and interface with memory 420, flash memory interface 430, external bus interface 435, and/or network interface 440. Each of the one or more processors 415 may be consistent with a central processing unit, a core in a multi-core processor, a multi-core processor, a microprocessor, a microcontroller, a digital signal processor, a graphics processing unit (GPU), a tensor processing unit (TPU), and/or the like.

Memory 420 may be used to store software executed by the one or more processors 415 and/or one or more data structures used during operation of computing device 405 and/or database proxy 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 420 includes a database proxy software module 445 that is responsible for controlling one or more aspects of the operation of computing device 405 and/or database proxy 400 including, for example, an operating system and/or software to use the functionality of database proxy module 410, the functionality of flash memory interface 430, the functionality of external bus interface 435, the functionality of network interface 440, and/or the like. In some examples, database proxy software module 445 may include one or more APIs, software libraries, and/or the like to provide the desired control and/or access to the functionality of database proxy 400. As but one example, database proxy software module 445 may include a network interface stack as part of the operating system and/or separate from the operating system that may be used, in conjunction with, network interface 440 to provide general network functionality (e.g., an implementation of TCP/IP and/or the like), the network functionality of network interfaces 132, 139, and/or 152, and/or the like.

Internal bus 425 provides internal communication within computing device 405 between the one or more processors 415, memory 420, flash memory interface 430, external bus interface 435, and/or network interface 440. In some examples, internal bus 425 may include one or more control buses, address buses, data buses, and/or the like. In some examples, internal bus 425 may support any bus architecture and/or protocol commonly used in computing devices, such as an Advanced eXtensible Interface (AXI) and/or the like.

Flash memory interface 430 provides an interface to one or more optional flash memory devices 450 accessible to computing device 405 and/or database proxy 400. In some examples, the one or more flash memory devices 450 may include one or more Non-Volatile Memory express (NVMe) devices, one or more solid-state drives (SSDs), and/or the like. In some examples, the one or more flash memory devices 450 may provide cache memory, buffer memory, non-volatile memory, and/or the like for computing device 405 and/or database proxy 400. And although the one or more flash memory devices 450 are shown separate from computing device 405, the one or more flash memory devices 450 may be included on a same chip as computing device 405.

External bus interface 435 provides an interface to one or more buses 455 external to computing device 405. In some examples, the one or more buses 455 may be used by computing device 405 to communicate with database proxy module 410. In some examples, the one or more buses 455 may include any type of bus, such as an Industry Standard Architecture (ISA) bus, an Extended ISA (EISA) bus, a Peripheral Component Interface (PCI) bus, a PCI Express (PCIe) bus, and/or the like.

Network interface 440 provides an interface to one or more networks 460 usable by computing device 405 and/or database proxy to communicate with other computing devices, other database proxies (e.g., database proxies 171-179), a database server (e.g., database server 190), one or more databases (e.g., databases 191-199), one or more client devices (e.g., client 110), and/or the like. In some examples, the one or more networks 460 may be consistent with networks 120, 160, and/or 180. In some examples, network interface 440 and the network interface stack of database proxy software module 445 may implement the functionality of one or more of network interfaces 132, 139, and/or 152.

As further shown in FIG. 4, database proxy 400 includes database proxy module 410. According to some embodiments, database proxy module 410 may be implemented using a board, a SoC, an FPGA, and ASIC, and/or the like. In some examples, database proxy module 410 provides hardware acceleration to one or more of the functions of database proxy 400. As also shown, database proxy module 410 includes an external bus interface 465, an internal bus 470, a request processor 475, a memory interface 480, memory 485, and one or more optional auxiliary compute modules 490. In some examples, external bus interface 465 is similar to external bus interface 435 and provides an interface to the one or more buses 455 used for communication between computing device 405 and database proxy module 410. In some examples, internal bus 470 is similar to internal bus 425.

Request processor 475 provides the main functionality of database proxy module 410. In some examples, the main functionality includes any of the functionality described with respect to FIG. 9, method 200, and/or method 300. In some examples, request processor 475 is consistent with request processor 131 and includes the functionality of one or more of index converter 133, serdes engine 134, hashing unit 135, router 136, compute block 137, serdes engine 138, and/or storage engine 140.

According to some embodiments, request processor 475 may be configured to optionally support databases organized around indexes and indexing, databases organized around key-value abstraction, and/or both indexes and key-value abstraction. In some examples, when request processor 475 supports indexes and indexing, request processor 475 includes an index convertor consistent with index converter 133. In some examples, when request processor 475 supports key-value abstraction, request processor 475 includes a key-value engine for accessing the databases (e.g., the databases coupled to database proxy 400 through the one or more networks 460). In some examples, the key-value engine may be supported by database proxy software module 445, which implements address translation and/or the like so that only the key-value abstraction is supplied to request processor 475.

Memory interface 480 provides an interface to one or more memory devices in memory 485. In some examples, memory 485 includes one or more RAM devices, such as one or more SRAMs, DRAMs, and/or the like. In some examples, memory interface 480 and memory 485 provide local and/or cache memory for request processor 475. In some examples, memory interface 480 and memory 485 provide functionality similar to cache 145. In some examples, memory interface 480 may be consistent with a double data rate (DDR) interface (such as DDR, DDR2, DDR3, and/or DDR4), a H-MMU interface (e.g., as described with respect to FIG. 9), a high bandwidth memory interface, and/or the like. And although memory 485 is shown within database proxy module 410, memory 485 may be external to database proxy module 410, such as in one or more separate chips, memory boards, and/or the like.

The one or more auxiliary compute modules 490 provide additional computing support and/or functionality to request processor 475 and/or database proxy software module 445. In some examples, database proxy software module 445 may access the one or more auxiliary compute modules 490 through internal bus 425, external bus interface 435, the one or more buses 455, external bus interface 465, and internal bus 470 and/or through request processor 475. In some examples, the one or more auxiliary compute modules 490 may include computing capability to support the compute block of request processor 475 (e.g., compute block 137), the serdes engines of request processor 475 (e.g., serdes engines 134 and/or 138), serdes engines 151 and/or 153, and/or the like. In some examples, the one or more auxiliary compute modules 490 may include functionality to support compression, decompression, encryption, security, artificial intelligence inferencing (e.g., through neural network implementation and/or emulation), and/or the like. In some examples, the artificial intelligence inferencing may be supported using one or more GPUs, TPUs, hardware AI inferencing engines (e.g., the AI acceleration units provided by Xilinx), and/or the like.

As shown in FIG. 14, a database proxy 500 includes a computing device 510 and a database proxy module 520 shown as separate units. In some examples, computing device 510 and database proxy module 520 may be implemented as a system on a chip (such as a FPGA with an embedded processor), separate chips on a chip stack, separate boards in a computing device (e.g., as a set of stacked boards, boards in a card cage, and/or the like), and/or the like. In some examples, database proxy 500 is consistent with the database proxy of FIG. 9 and/or database proxy 130.

According to some embodiments and as shown in FIGS. 14 and 15, like numbered and named units have a same and/or similar purpose and function. One of the differences between database proxy 400 and database proxy 500 is that flash memory interface 430 of computing device 405 is moved to database proxy module 520 as a flash memory interface 530 and the one or more flash memory devices 450 of database proxy 400 are moved to one or more flash memory devices 540 in database proxy module 520. In addition, request processor 475 is replaced with a request processor 550. In some examples, request processor 550 is substantially similar to request processor 475 except that it also includes the ability to use flash memory interface 530 to access the one or more flash memory devices 540 to, for example, have access to flash-based cache storage, flash-based buffering, non-volatile storage, and/or the like. In some examples, flash memory interface 530 is substantially similar to flash memory interface 430 except that it is driven by request processor 550. In some examples, the one or more flash memory devices 540 are substantially similar to the one or more flash memory devices 450. Further, database proxy software module 445 of database proxy 400 is replaced with a database proxy software module 560 of computing device 510. In some examples, database proxy software module 560 includes substantially similar APIs, software libraries, and/or the like as those of database proxy software module 445. In some examples, database proxy software module 560 further includes APIs, software libraries, and/or the like to access the one or more flash memory devices 540 through request processor 550.

According to some embodiments, database proxy 500 may also support different configurations. In some examples, memory 485 may be external to database proxy module 520, such as in one or more separate chips, memory boards, and/or the like. In some examples, the one or more flash memory devices 540 may be external to database proxy module 520, such as in one or more separate chips, memory boards, and/or the like.

As shown in FIG. 15, a database proxy 600 includes a computing device 405 and a database proxy module 610 shown as separate units. In some examples, database proxy module 510 provides hardware acceleration to one or more of the functions of database proxy 500. In some examples, computing device 510 and database proxy module 610 may be implemented as a system on a chip (such as a FPGA with an embedded processor), separate chips on a chip stack, separate boards in a computing device (e.g., as a set of stacked boards, boards in a card cage, and/or the like), and/or the like. In some examples, database proxy 600 is consistent with the database proxy of FIG. 9 and/or database proxy 130.

According to some embodiments and as shown in FIGS. 13, 14, and 15, like numbered and named units have a same purpose and function. One of the differences between database proxy 400 and database proxy 600 is that the functionality of request processor 475 and/or the one or more auxiliary compute modules 490 are implemented in a database proxy software module 620 that also implements the functionality of database proxy software module 445. In some examples, database proxy software module 620 includes one or more APIs, software libraries, and/or the like to implement the functionality of request processor 475 and/or the one or more auxiliary compute modules 490.

Another of the differences between database proxy 400 and database proxy 600 is that in database proxy 600, database proxy module 610 additionally supplies hardware-accelerated network functionality to replace and/or supplement the network functionality provided by network interface 440 in computing device 405. In some examples, the network functionality of database proxy module 610 includes a network interface 630 coupled to external bus interface 465, which is used to access a network 640. In some examples, network interface 630 may be substantially similar to network interface 440. In some examples, network 640 may be substantially similar to network 460. In some examples, network interface 630 may include some or all of the functionality of network interface 440 and the network interface stack of database proxy software module 445. In some examples, network interface 630 may implement the functionality of one or more of network interfaces 132, 139, and/or 152.

As further shown in FIG. 15, database proxy module 610 includes a memory interface 650 and memory 660. In some examples, memory interface 650 and/or memory 660 may provide cache, buffering, and/or other storage functionality for network interface 630 and/or computing device 405 and database proxy software module 620. In some examples, memory interface 650 is substantially similar to memory interface 480. In some examples, memory 660 is substantially similar to memory 660.

According to some embodiments, database proxy 600 may also support different configurations. In some examples, memory 660 may be external to database proxy module 610, such as in one or more separate chips, memory boards, and/or the like. In some examples, database proxy module 610 may include a flash memory interface (e.g., similar to flash memory interface 530) and/or one or more flash memory devices (e.g., similar to the one or more flash memory devices 540) as a supplement to and/or a replacement for flash memory interface 430 and/or the one or more flash memory devices 450, respectively.

And although not expressly shown in FIGS. 13-15, the additional functional units of database proxy 130 (e.g., logging and metric unit 159, database plugin 150, serdes engines 151 and/or 153) may be optionally implemented by one or more of database proxy software module 445, database proxy software module 560, database proxy software module 620, request processor 475, request processor 550, and/or the one or more auxiliary compute modules 490.

As described above, the various embodiments of the database and NoSQL proxies and the data center architectures using database and NoSQL proxies are advantageously able to achieve high throughput, access large amounts of data using tiered memory, and/or accelerate serialization and deserialization operations.

Some examples of the proxies and servers described herein may include non-transient, tangible, machine-readable media that include machine-readable and executable code that when run by one or more processors (e.g., the one or more processors 415) may cause the one or more processors to perform the processes and methods described herein. Some common forms of machine readable media that may include the processes and methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A database proxy comprising:
   a computing device including:
      one or more processors,
      memory,
      a first bus interface, and
      a network interface coupling the database proxy to one or more networks; and
   a hardware-accelerated database proxy module being separate from the computing device including:
      a second bus interface coupled to the first bus interface via one or more buses, and
      a request processor comprising:
         an index converter configured to receive a database request from a client via the one or more networks and the network interface, the database request referencing data using a secondary index, the index converter converting the second index to a primary index;
         a first serdes engine configured to convert at a line rate a formatting protocol of the database request to a native formatting protocol of the request processor;
         a hashing unit configured to apply a hashing function to the primary index to determine a hash value to organize and retrieve data;
         a router configured to determine whether the database request is a read request, to determine a location where the data requested by the database request is stored based on the hash value when the database request is a read request, and to determine whether the hash value is in a range assigned to the database proxy or another database proxy to which to route the database request for load balancing between the database proxy and the other database proxy;

a storage engine configure to, in response to the hash value being in the range assigned to the database proxy, determine whether the data requested by the database request is stored in a cache of the database proxy, retrieve the data from the cache when stored in the cache, and return the data to the router; and a second serdes engine configured to convert the data received by the router from the storage engine from the native formatting protocol of the request processor to the formatting protocol of the database request at the line rate to return the data to the client; and a database plugin configured to, when the database request is a write request and when the hash value is in the range assigned to the database proxy, write the data from the database request to a database after the data is written by the storage engine to the cache using the hash value.

2. The database proxy of claim 1, wherein the computing device further includes a flash memory interface for accessing one or more flash memory devices.

3. The database proxy of claim 1, wherein the database proxy further includes a flash memory interface for accessing one or more flash memory devices.

4. The database proxy of claim 1, wherein the database proxy further includes one or more auxiliary compute modules providing support for one or more of compression, decompression, encryption, security, or artificial intelligence inferencing.

5. The database proxy of claim 1, wherein the one or more buses include one or more Industry Standard Architecture (ISA), Extended ISA (EISA), a Peripheral Component Interface (PCI), or PCI Express (PCIe) buses.

6. The database proxy of claim 1, wherein the memory includes machine-readable code executable by the one or more processors to:
receive the database read-request; and
forward the database read-request to the request processor.

7. The database proxy of claim 6, wherein the machine-readable code includes a TCP/IP stack.

8. The database proxy of claim 1, wherein the cache is accessed via a hybrid memory management unit.

9. The database proxy of claim 1, wherein the computing device and the database proxy comprise a system on a chip or the database proxy is a board separate from the computing device.

10. The database proxy of claim 1, wherein the database proxy is further configured to process database update requests and database delete requests.

11. A method of processing database requests using a database proxy, the method comprising:
receiving, via a network interface of a computing device, a database request from a client, the database request referencing data using a secondary index;
forwarding, using one or more buses, the database request to a request processor of a hardware accelerated database proxy module, the database proxy module being separate from the computing device;
processing, by the request processor, the database request, the processing comprising:
converting the second index to a primary index;
converting at a line rate a formatting protocol of the database request to a native formatting protocol of the request processor;
applying a hashing function to the primary index to determine a hash value to organize and retrieve data;
determining whether the database request is a read request,
determining a location where the data requested by the database request is stored based on the hash value when the database request is a read request,
determining whether the hash value is in a range assigned to the database proxy or another database proxy to which to route the database request for load balancing between the database proxy and the other database proxy;
determining, in response to the hash value being in the range assigned to the database proxy, whether the data requested by the database request is stored in a cache of the database proxy;
retrieving the data from the cache when stored in the cache;
converting the retrieved data from the native formatting protocol of the request processor to the formatting protocol of the database request at the line rate to return the retrieved data to the client; and
writing, when the database request is a write request and when the hash value is in the range assigned to the database proxy, the data from the database request to a database after the data is written to the cache using the hash value.

12. The method of claim 11, wherein the processing further comprises for one or more of compression, decompression, encryption, authentication, or artificial intelligence inferencing.

13. The method of claim 11, further comprising processing database update requests and database delete requests.

* * * * *